(12) United States Patent
Howson

(10) Patent No.: US 12,166,954 B2
(45) Date of Patent: *Dec. 10, 2024

(54) STEREOSCOPIC GRAPHICS PROCESSING

(71) Applicant: Imagination Technologies Limited, Kings Langley (GB)

(72) Inventor: John W. Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,665

(22) Filed: May 1, 2023

(65) Prior Publication Data

US 2023/0269357 A1 Aug. 24, 2023

Related U.S. Application Data

(63) Continuation of application No. 17/215,647, filed on Mar. 29, 2021, now Pat. No. 11,677,927.

(30) Foreign Application Priority Data

Mar. 27, 2020 (GB) ...................................... 2004444

(51) Int. Cl.
*H04N 13/275* (2018.01)
*G06T 1/20* (2006.01)
*G06T 1/60* (2006.01)
*H04N 13/00* (2018.01)
*H04N 13/178* (2018.01)

(52) U.S. Cl.
CPC ............. *H04N 13/275* (2018.05); *G06T 1/20* (2013.01); *G06T 1/60* (2013.01); *H04N 13/178* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 2011/0050687 | A1 | 3/2011 | Alyshev et al. |
| 2011/0074925 | A1 | 3/2011 | Turner et al. |
| 2013/0027394 | A1 | 1/2013 | Kho et al. |
| 2017/0124748 | A1 | 5/2017 | Ellis |
| 2018/0276873 | A1 | 9/2018 | Croxford et al. |

(Continued)

FOREIGN PATENT DOCUMENTS

EP 3091739 A1 11/2016

*Primary Examiner* — Jason A Pringle-Parker
(74) *Attorney, Agent, or Firm* — Potomac Law Group, PLLC; Vincent M DeLuca

(57) ABSTRACT

Methods and graphics processing modules for rendering a stereoscopic image including left and right images of a three-dimensional scene. Geometry is processed in the scene to generate left data for use in displaying the left image and right data for use in displaying the right image. Disparity is determined between the left and right data by comparing the generated left data and the generated right data used in displaying the stereoscopic image. In response to identifying at least a portion of the left data and the right data as non-disparate, a corresponding portion of the left image and the right image is commonly processed (e.g. commonly rendered or commonly stored). In response to identifying at least a portion of the left data and the right data as disparate, a corresponding portion of the left image and the right image is separately processed (e.g. separately rendered or separately stored).

20 Claims, 12 Drawing Sheets

(56) References Cited

U.S. PATENT DOCUMENTS

2018/0293779 A1 10/2018 Kaburlasos et al.
2018/0300903 A1 10/2018 Gierach et al.
2019/0188907 A1 6/2019 Howson

STEREOSCOPIC GRAPHICS PROCESSING

CROSS-REFERENCE TO RELATED APPLICATIONS AND CLAIM OF PRIORITY

This application is a continuation under 35 U.S.C. 120 of Application Serial No. 5 17/215,647 filed Mar. 29, 2021, now U.S. Pat. No. 11,677,927, which claims foreign priority under 35 U.S.C. 119 from United Kingdom Application No. 2004444.2 filed Mar. 27, 2020, the contents of which are incorporated herein by reference.

BACKGROUND

Stereoscopic images comprise a pair of images of a scene, namely a left and right image. Augmented Reality (AR) and Virtual Reality (VR) applications typically make use of such stereoscopic images of the same scene, each image to be viewed by a different eye of the viewer. The two displayed images each display an image representing a different viewpoint in the scene, one from the viewpoint of the left eye and the other from the viewpoint of the right eye. The viewer therefore sees a stereo image which provides a perception of depth in the scene. Depending upon a number of factors relating to the scene, the two rendered images may each contain image portions that are the same in both the left and right rendered images and may include other image portions that differ between the left and right rendered images.

There is a need for an improved approach to rendering these two generated images for AR and VR applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect there is provided a method of rendering a stereoscopic image comprising a left image and a right image of a three-dimensional scene in a graphics processing module. The method comprises the steps of: processing geometry in the scene to generate left data for use in displaying the left image and right data for use in displaying the right image; determining disparity between the left data and the right data based upon a comparison of the generated left data and the generated right data used in displaying the stereoscopic image; in response to identifying at least a portion of the left data and the right data as non-disparate, commonly processing a corresponding portion of the left image and the right image; and in response to identifying at least a portion of the left data and the right data as disparate, separately processing a corresponding portion of the left image and the right image.

Optionally, the left data comprises data for elements of geometry for the left image and the right data comprises data for elements of geometry for the right image.

Optionally, the step of commonly processing the corresponding portion of the left image and the right image comprises rendering a single pixel value for use in a corresponding pixel position in both the left and right images.

Optionally, the step of separately processing the corresponding portion of the left image and the right image comprises rendering separate left and right pixel values for a corresponding pixel position in the left and right images.

Optionally, the method further comprises maintaining, for each corresponding pixel position in the left image and the right image, a disparity status that indicates whether there is disparity between the left and right data associated with that pixel position.

Optionally, the disparity status is maintained as elements of geometry are processed and wherein the disparity status is updated based upon the opacity of the received geometry.

Optionally, in response to determining that a received element of geometry is visible at a pixel position, the method comprises updating the disparity status of that pixel position to reflect the disparity between corresponding elements of geometry for the left image and the right image.

Optionally, the left data comprises pixel values for the left image and the right data comprises pixel values for the right image.

Optionally, the step of commonly processing the corresponding portion of the left image and the right image comprises storing a single pixel value for use in a corresponding pixel position in both the left and right images.

Optionally, the step of separately processing the corresponding portion of the left image and the right image comprises storing separate left and right pixel values for a corresponding pixel position in the left and right images.

Optionally, maintaining the disparity status comprises maintaining a left buffer, a right buffer, and optionally a common buffer, and wherein commonly processing a corresponding portion of the left image and the right image comprises storing a single pixel value, in either the common buffer or in one of the left and right buffer, for a corresponding pixel position in both the left and right images; and separately processing the corresponding portion of the left image and the right image comprises storing separate left and right pixel values, either in respective left and right buffers or in any one of the left and right buffers, for a corresponding pixel position in the left and right images.

Optionally, the method comprises reconstructing separate left and right images based upon the commonly processed pixel values and the separately processed pixel values.

Optionally, commonly processing a corresponding portion of the left image and the right image comprises storing a single set of geometry data for an element of geometry that is not disparate for the left and right images; and separately processing a corresponding portion of the left image and the right image comprises storing separate left and right geometry data for an element of geometry that is disparate for the left and right images.

Optionally, at least a portion of the left data and the at least a portion of the right data relates to a corresponding group of pixels of the left image and the right image.

Optionally, the method further comprises maintaining, for each corresponding group of pixels of the left image and group of pixels of the right image, a disparity status that indicates whether there is disparity between the left data for use in displaying the group of pixels in the left image and the right data for use in displaying the corresponding group of pixels in the right image.

Optionally, commonly processing a corresponding group of pixels of the left image and the right image comprises rendering pixel values for a single group of pixels for use in displaying the group of pixels in the left image and for use in displaying the corresponding group of pixels in the right image; and separately processing a corresponding group of pixels of the left image and the right image comprises separately rendering pixel values for the group of pixels in the left image and for the corresponding group of pixels in the right image.

Optionally, commonly processing a corresponding group of pixels of the left image and right image comprises storing pixel values for a single group of pixels for use in displaying the group of pixels in the left image and for use in displaying the corresponding group of pixels in the right image; separately processing a corresponding group of pixels in the left image and the right image comprises separately storing pixel values for the group of pixels in the left image and storing pixel values for the corresponding group of pixels in the right image.

Optionally, commonly storing pixel values for a single group of pixels for use in displaying the group of pixels in the left image and for use in displaying the corresponding group of pixels in the right image comprises storing, in memory, the single group of pixels and a flag or reference indicating that the pixel values are for use in displaying the group of pixels in both the left image and the right image.

Optionally, the group of pixels is stored in a frame buffer memory from which the pixel values for the left and right images are to be retrieved for display.

Optionally, the graphics processing module is a tile-based graphics processing module, and wherein the group of pixels forms a tile.

Optionally, the left data comprises data for elements of geometry for the left image and the right data comprises data for elements of geometry for the right image, and wherein the method further comprises maintaining in memory a common tile.

According to a second aspect there is provided a graphics processing module configured to render a stereoscopic image comprising a left image and a right image of a three-dimensional scene. The graphics processing module being configured to: process geometry in the scene to generate left data for use in displaying the left image and right data for use in displaying the right image; determine disparity between the left data and the right data based upon a comparison of the generated left data and the generated right data used in displaying the stereoscopic image; in response to identifying at least a portion of the left data and the right data as non-disparate, commonly process a corresponding portion of the left image and the right image; and in response to identifying at least a portion of the left data and the right data as disparate, separately process a corresponding portion of the left image and the right image.

Optionally, the left data comprises data for elements of geometry for the left image and the right data comprises data for elements of geometry for the right image.

Optionally, the graphics processing module comprises a tile renderer configured to commonly process the corresponding portion of the left image and the right image by rendering a single pixel value for use in a corresponding pixel position in both the left and right images.

Optionally, the graphics processing module comprises a tile renderer configured to separately process the corresponding portion of the left image and the right image by rendering separate left and right pixel values for a corresponding pixel position in the left and right images.

Optionally, the graphics processing module comprises a disparity status module configured to maintain, for each corresponding pixel position in the left image and the right image, a disparity status that indicates whether there is disparity between the left and right data associated with that pixel position.

Optionally, the disparity status module is configured to maintain the disparity status as elements of geometry are processed and wherein the disparity status module is configured to update the disparity status based upon the opacity of the received geometry.

Optionally, the disparity status module is configured to, in response to determining that a received element of geometry is visible at a pixel position, update the disparity status of that pixel position to reflect the disparity between corresponding elements of geometry for the left image and the right image.

Optionally, the left data comprises pixel values for the left image and the right data comprises pixel values for the right image.

Optionally, the graphics processing module comprises a data writer configured to commonly process the corresponding portion of the left image and the right image by causing a single pixel value to be stored for use in a corresponding pixel position in both the left and right images.

Optionally, the graphics processing module comprises a data writer configured to separately process the corresponding portion of the left image and the right image by causing separate left and right pixel values to be stored for a corresponding pixel position in the left and right images.

Optionally, the graphics processing module comprises a common buffer, a left buffer, and a right buffer, and wherein the common buffer is configured to store pixel values, which have been commonly processed, for corresponding pixel positions in both the left and right images; the left buffer is configured to store pixel values, which have been separately processed, for pixel positions in only the left image; and the right buffer is configured to store pixel values, which have been separately processed, for pixel positions in only the right image.

Optionally, the graphics processing module comprises a view reconstruction module configured to reconstruct separate left and right images based upon the commonly processed pixel values and the separately processed pixel values.

Optionally, the graphics processing module comprises a geometry compressor configured to: commonly process a corresponding portion of the left image and the right image by causing a single set of geometry data to be stored for an element of geometry that is not disparate for the left and right images; and separately process a corresponding portion of the left image and the right image by causing separate left and right geometry data to be stored for an element of geometry that is disparate for the left and right images.

Optionally, the at least a portion of the left data and the at least a portion of the right data relates to a corresponding group of pixels of the left image and the right image.

Optionally, the graphics processing module is further configured to maintain, for each corresponding group of pixels of the left image and group of pixels of the right image, a disparity status that indicates whether there is disparity between the left data for use in displaying the group of pixels in the left image and the right data for use in displaying the corresponding group of pixels in the right image.

Optionally, the graphics processing module comprises a tile renderer configured to: commonly process a corresponding group of pixels of the left image and the right image by rendering pixel values for a single group of pixels for use in displaying the group of pixels in the left image and for use in displaying the corresponding group of pixels in the right image; and separately process a corresponding group of pixels of the left image and the right image by separately rendering pixel values for the group of pixels in the left image and for the corresponding group of pixels in the right image.

Optionally, the graphics processing module comprises a data writer configured to: commonly process a corresponding group of pixels of the left image and the right image by causing pixel values for a single group of pixels to be stored for use in displaying the group of pixels in the left image and for use in displaying the corresponding group of pixels in the right image; and separately process a corresponding group of pixels in the left image and the right image by causing pixel values for the group of pixels to be stored in the left image and by causing pixel values for the corresponding group of pixels to be separately stored in the right image.

Optionally, the data writer is configured to cause pixel values for a single group of pixels to be commonly stored for use in displaying the group of pixels in the left image and for use in displaying the corresponding group of pixels in the right image by causing the single group of pixels and a flag or reference to be stored in memory, wherein the flag or reference indicates that the pixel values are for use in displaying the group of pixels in both the left image and the right image.

Optionally, the data writer is configured to cause the group of pixels to be stored in a frame buffer memory from which the pixel values for the left and right images are to be retrieved for display.

Optionally, the graphics processing module is a tile-based graphics processing module, and wherein the group of pixels forms a tile.

Optionally, the left data comprises data for elements of geometry for the left image and the right data comprises data for elements of geometry for the right image, and wherein the graphics processing module is configured to cause a common tile to be maintained in memory.

According to a third aspect there is provided a graphics processing module configured to perform the method of any variation of the first aspect.

Optionally, the graphics processing module of any variation of the second or third aspects may be embodied in hardware on an integrated circuit.

According to a fourth aspect there is provided a method of manufacturing a graphics processing module according to any variation of the second or third aspects.

According to a fifth aspect there is provided computer readable code configured to cause the method of any variation of the first aspect to be performed when the code is run.

According to a sixth aspect there is provided a computer readable storage medium having encoded thereon the computer readable code of the fifth aspect.

According to a seventh aspect there is provided an integrated circuit definition dataset that, when processed in an integrated circuit manufacturing system, configures the integrated circuit manufacturing system to manufacture a graphics processing module according to any variation of the second or third aspects.

According to an eighth aspect there is provided a non-transitory computer readable storage medium having stored thereon a computer readable description of an integrated circuit that, when processed in an integrated circuit manufacturing system, causes the integrated circuit manufacturing system to manufacture a graphics processing module according to any variation of the second or third aspects.

According to a ninth aspect there is provided an integrated circuit manufacturing system configured to manufacture a graphics processing module according to any variation of the second or third aspects.

According to a tenth aspect there is provided integrated circuit manufacturing system comprising: a non-transitory computer readable storage medium having stored thereon a computer readable description of an integrated circuit that describes the graphics processing module according to any variation of the second or third aspects; a layout processing system configured to process the integrated circuit description so as to generate a circuit layout description of an integrated circuit embodying the graphics processing module according to any variation of the second or third aspects; and an integrated circuit generation system configured to manufacture the graphics processing module according to the circuit layout description.

The graphics processing module may be embodied in hardware on an integrated circuit. There may be provided a method of manufacturing, at an integrated circuit manufacturing system, a graphics processing module. There may be provided an integrated circuit definition dataset that, when processed in an integrated circuit manufacturing system, configures the system to manufacture a graphics processing module. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing module.

There may be provided an integrated circuit manufacturing system comprising: a non-transitory computer readable storage medium having stored thereon a computer readable integrated circuit description that describes the graphics processing module; a layout processing system configured to process the integrated circuit description so as to generate a circuit layout description of an integrated circuit embodying the graphics processing module; and an integrated circuit generation system configured to manufacture the graphics processing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 14(*b*) shows a method of retrieving from memory data stored using the method of FIG. 14(*a*);

Figure 1:
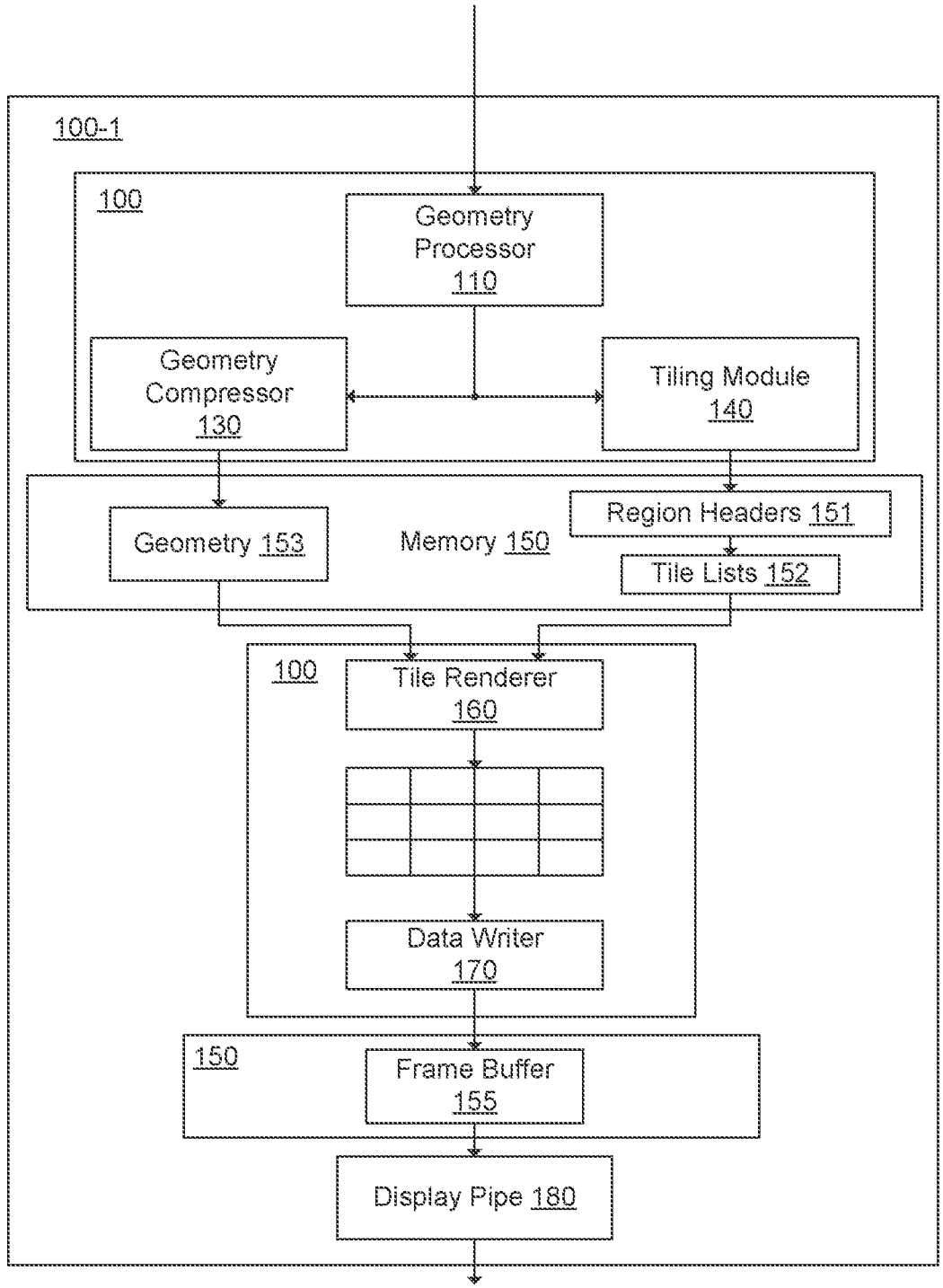
FIG. 1 shows an example of a graphics processing module.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Stereoscopic Images

Stereoscopic images comprise two images of the same scene at a given point in time and rendered from two different viewpoints, namely a left and a right image that are respectively viewed by a corresponding eye of the viewer. The viewpoints of the two rendered images are separate viewpoints of the same scene to represent the respective positions of the eyes of the viewer. Rendering a stereoscopic image can place a significant processing burden upon graphics processing modules since they generate effectively twice as many images when compared with traditional single imaging systems. Stereoscopic images have application, for example, in graphics processing systems that are designed for use in augmented reality (AR) and virtual reality (VR) applications.

Tile-Based Deferred Rendering (TBDR)

One approach to traditional graphics processing to generate a single image of a scene at a given point in time is tile-based deferred rendering (TBDR). FIG. 1 illustrates a high level example of a computer system 100-1 comprising a graphics processing module 100 configured to perform processing using a TBDR approach. The TBDR approach can be split into two phases, a tiling phase and a rendering phase. The tiling phase is performed by a geometry processor 110, geometry compressor 130, and a tiling module 140. The rendering phase is performed by a tile renderer 160 and a data writer 170. FIG. 1 illustrates graphics processing module 100 as two separate elements. However, this is for the purpose of illustrating the tiling and rendering phases. The graphics processing module 100 may be one or more physical modules.

The graphics processing module 100 comprises a geometry processor 110 configured to receive a stream of geometry comprising elements of geometry present within a scene to be rendered and to process the received geometry as defined for a specific application. The geometry processor 110 may also be configured to transform data representing coordinates of each element of geometry from a set of coordinates defined in three-dimensional space (scene-space) to data representing a set of coordinates defined in two-dimensional space (screen-space) that represents the rendered view of the scene from a viewpoint. Data representing the transformed geometry is then compressed using a geometry compressor 130 for storing geometry 153 in memory 150 (which may be memory internal or external to the graphics processing module 100).

In addition, the graphics processing module 100 comprises a tiling module 140 configured to perform a process of tiling. The tiling process comprises receiving the data representing the transformed geometry (typically in the form of vertices representing primitives). The tiling module 140 operates upon geometry in a number of different portions of the screen-space (referred to as tiles). For each tile, the tiling module 140 is configured to determine which primitives are at least partially located in the tile (i.e. that portion of the screen-space). The tiling module 140 is configured to construct in memory 150 a number of tile lists 152.

Tile lists are lists, per tile, of the elements of geometry that are at least partially located in that tile. The tiling module 140 is also configured to store in memory 150 a number of region headers 151 that provide additional data relating to one or more portions of the screen-space. For example, any additional metadata that relates to a portion of the screen-space (of one or more tiles) can be stored in memory for use during the subsequent rendering phase.

During the rendering phase, at least a portion of the geometry 153, region headers 151, and tile lists 152 are retrieved from memory 150 by tile renderer 160 and each tile is separately rendered. The at least a portion of the geometry 153 is selected for retrieval by the tile renderer 160 for a given tile in accordance with the geometry identified in the tile list for that tile. The tile renderer 160 generates, for each pixel of an image to be rendered, a pixel value representing the colour value to be rendered at that pixel based upon the element(s) of geometry visible at that pixel position. The generated pixel values are arranged into tiles that are stored, using data writer 170, to memory 150 as pixel values of an image 155. This portion of memory 150 can be considered to be a frame buffer which may be a different portion of the same memory or a separate memory. The stored pixel values of the image 155 effectively form the image to be displayed, with some optional data compression for memory efficiency.

If compressed, the data is decompressed when retrieved from memory. When the image is to be displayed, it is retrieved from memory 150 and passed to a display pipe 180 for final processing before it is displayed.

Traditional graphics processing modules, such as those configured to follow a TBDR approach, are often optimised for generating only a single image of a scene at each instance of time. However, when generating pairs of images that form stereoscopic images of the same scene at a given instance in time, it may be necessary for the same graphics processing module to produce two images of the same scene within a fixed period of time (e.g. to ensure a predetermined frame rate), which increases (e.g. effectively doubles) the processing burden of the graphics processing module. Alternatively, it may be necessary to reduce (e.g. halve) the rate at which stereoscopic images are generated to allow the graphics processing module to generate both left and right images. For example, in VR and/or AR applications, the left and right images of a stereoscopic image may need to be rendered in real-time and thus may increase (e.g. effectively double) the amount of processing required by the graphics processing module.

Disparity

The inventor has recognised that disparity may occur between the contents of a pair of images that form a generated stereoscopic image. The disparity between images is caused by relative differences in position of geometry between left and right images. The differences in geometry may or may not result in differences in the rendered values in the left and right images. The inventor has also recognised that disparity is not always constant across the entirety of the left and right images of a stereoscopic image of a scene taken from different viewpoints. For example, the relative positions of some objects in left and right images in some regions of the images may result in some regions of the images having greater disparity than other regions of those images. By determining the level of disparity between corresponding stereoscopic images of a scene, it has been recognised that efficiency improvements can be made in the rendering of a stereoscopic image. Some of the approaches described herein are set out in relation to TBDR systems, but are also applicable to other graphics processing module architectures for example within immediate mode rendering (IMR) systems.

As discussed previously, stereoscopic images comprise two images of the same scene from different viewpoints (left and right viewpoints) which replicate the relative positions of a viewer's eyes. Viewpoints may also be associated with a viewing direction, and the viewing directions of the two viewpoints may, for example, be parallel, or may converge at a particular distance, replicating the behaviour of a viewer's eyes. One of the rendered images can be considered to represent the viewpoint of the left eye and the other image the right eye. Due to the different positions of the left and right viewpoints in the scene, the content of the rendered image for the left eye, herein the left image, may differ from the content of the rendered image for the right eye, herein the right image. Put another way, the rendered content of the left image may differ from the rendered content of the right image. An example of disparity between the left and right images is illustrated in FIGS. 2(*a*) to 2(*e*).

FIG. 2(*a*) illustrates a view of a 3D scene 200 that is to be rendered for stereoscopic display. As shown in FIG. 2(*b*), the scene 200 includes an object 210 located at a distance from the left and right viewpoints from which the scene is to be rendered. The distance of the object 210 from left 220 and right 225 viewpoints of the scene affects the level of disparity between the resultant left and right images. FIGS. 2(*b*) and 2(*c*) illustrate plan views of alternative scenes that are respectively identified as 200-1 and 200-2 that each include an object 210. Each scene has two viewpoints, namely a left viewpoint 220 and a right viewpoint 225. Object 210 is located within the scenes 200-1 and 200-2 at different relative positions to the different viewpoints 220, 225. Specifically, the distance between object 210 and the left and right viewpoints is greater in FIG. 2(*b*) than in FIG. 2(*c*).

FIGS. 2(*d*) and 2(*e*) respectively illustrate example images rendered from scenes 200-1 and 200-2 from the left 220 and right 225 viewpoints. Left images 230-1, 230-2 and right images 235-1, 235-2 each contain a representation of the object 210 within the respective scene 200-1, 200-2. In FIG. 2(*d*), the object appears in a very similar (or imperceptibly different or acceptably perceptibly different) location with the left image 230-1 and the right image 235-1. This is because the object 210 is located at a large distance from the viewpoints and the disparity in position of the object between left and right viewpoints is imperceptible in the resultant image. In contrast, in FIG. 2(*e*), the object 210 is rendered at visibly different pixel coordinates within the left 230-2 and right 235-2 rendered images. This is because the object 210 is located close to the viewpoints and the relative position of the object 210 when viewed from the left and right viewpoints varies. This difference in the position of the object 210 within the respective rendered images can be considered to be the disparity in the position of the object between the left and right images. Furthermore, it will be appreciated that a single object may be located at a range of depths from a given viewpoint. In such a circumstance, a corresponding object rendered in left and right images may have a different degree of disparity across the object.

Disparity may occur between the rendered left and right images. In addition, the disparity in the images may not be consistent across the entire area of both images, since the disparity may be dependent upon a number of factors relating to the characteristics of the scene, such as the distance of the object from the viewpoint. A scene may include multiple objects that are located at different distances from the left and right viewpoints and may also include other objects that are located at similar distances from the left and right viewpoints. When rendering a scene comprising multiple objects, a greater degree of disparity may occur for some objects within the scene than for others. In this way a particular region of the images may have portions with large or small disparity. For example, adjacent objects in the stereoscopic image may experience very different disparity—such that one object is very disparately rendered whilst the other is not. In some arrangements, the degree of disparity may therefore vary between objects, for example based on their distance from the viewpoints.

An example of relative differences in disparity across a scene is illustrated in FIGS. 3(*a*) and 3(*b*). FIG. 3(*a*) illustrates a plan view of a scene 300 in which two objects, 310 and 315, are present. Object 310 is located further from the left 320 and right 325 viewpoints of the scene than object 315 (i.e. the distance of object 310 from the viewpoints is greater than the distance of object 315 from the viewpoints). Accordingly, when the left 330 and right 335 images are rendered respectively from the left and right viewpoints 320, 325, the position of the object 310 in the rendered images 330, 335 is similar (or imperceptibly different or acceptably perceptibly different). In contrast, the position of object 315 in the rendered images 330 and 335 is visibly different. Put another way, the pixel coordinates in the images at which the object 315 is rendered in images 330 and 335 are different. In this way, the object 315 is to be rendered at different positions in each image.

As set out above, object 310 is located in a similar or the same position in images 330 and 335. In some arrangements it may be that the position in the two images may differ slightly but, due to the pixel resolution of the images 330 and 335, the rendered pixel values may be the same for both images. Put another way, slight differences in the relative position of the object 310 in the images may not result in any difference in the way the images are rendered. Further, it may be that slight differences in the location of objects in a scene (for example, in terms of orders of pixel widths) can be ignored since such disparity would not be perceptible to a viewer of the stereoscopic images. This will vary depending upon the specific application.

Figure 2A:
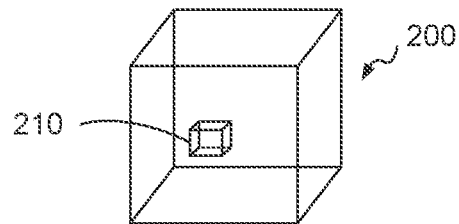
FIGS. 2(a) to 2(e) show a first example of rendering of objects within a scene that appear disparately located to the viewer.
Figure 2B:
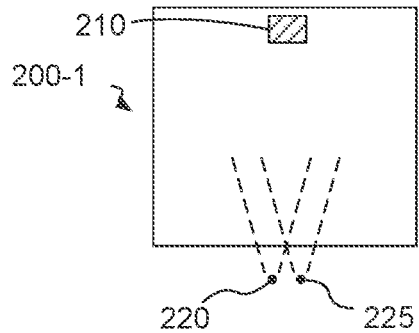
Figure 2C:
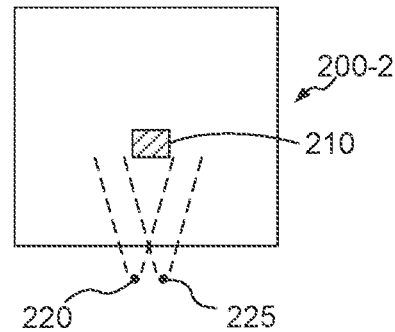
Figure 2D:
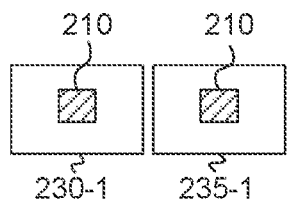
Figure 2E:
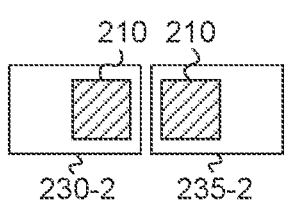
Figure 3A:
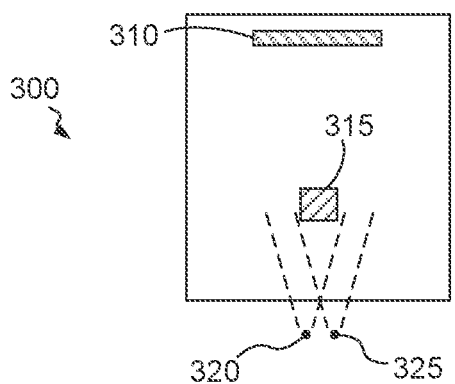
FIGS. 3(a) and 3(b) show a second example of rendering of disparately located objects within a scene.

In the examples shown in FIGS. 2(b), 2(c) and 3(a) the two viewpoints (e.g. 220 and 225, or 320 and 325) have parallel view directions. In other words, the view directions for rendering the left and right images converge at infinity. In this case, there is a slight two dimensional spatial shift between objects in the left and right images. This spatial shift is associated with the distance between the two viewpoints. The spatial shift is smaller for objects that are further from the viewpoints in the scene. In VR and AR applications, the distance between the viewpoints tends to be relatively small compared to the distance between a viewpoint and an object in the scene because the positions of the viewpoints correspond to the positions of a viewer's left and right eyes. Therefore, in these applications, the spatial shifts between left and right images tend to be small for a majority of objects in the scene. As described herein, a finite spatial shift in an object's relative position in the left and right images may be imperceptible, or may be acceptably small, such that the object can still be considered to be non-disparate, i.e. processed as if it were non-disparate.

The nature of an object's disparity is impacted by where the view directions associated with the two viewpoints converge. As described above, a small displacement in an object's position in the left and right images tends to occur when the view directions are parallel or converge at infinity. Even if the view directions converge at a distance closer than infinity, small displacements also tend to occur for objects that both: (i) are close to the distance of convergence, and (ii) lie between the distance of convergence and the viewpoints. Where the distance of convergence is in the mid or near field, objects that are located beyond the distance of convergence from the perspective of the viewpoints (e.g. objects located at infinity) effectively get their positions flipped in the left and right images. In other words, a distant object on the right of the right image may appear on the left of the left image. So, where the distance of convergence is not infinity, the relative displacement in an object's position in the left and right images tends to be greater than if the distance of convergence was infinity. Consequently the likelihood of being able to make efficiency gains by processing the object as a non-disparate object is reduced. However, there will still be some occasions in which the relative displacement of an object is small enough (e.g. imperceptibly small or acceptably small) for the object to be considered to be a non-disparate object even when the distance of convergence is not infinity.

Figure 3B:
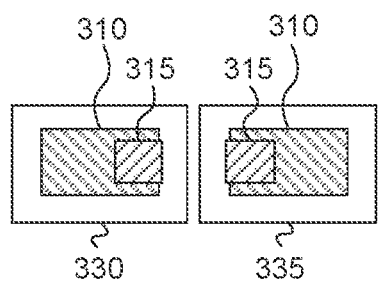

With reference to the example of FIG. 3, it will be appreciated that there are portions of the object 310 which are rendered in the same way in both images 330, 335 since the position is effectively unchanged. In addition, even if the object is located in a different location in the two stereoscopic images, the rendering of the object at specific pixel coordinates may be unchanged between images. For example, where object 310 is to be rendered with a fixed colour texture, the pixel colour value at each location may be unchanged between the images. In this way, the left and right rendered images may include common portions for some objects that do not result in disparity between the images. For example, in FIG. 3(b) portions of the object 310 at which the object 315 does not overlap may be rendered the same in both images.

The inventor has recognised that efficiencies in rendering stereoscopic images for display can be made for portions of the stereoscopic images for which there is little or no disparity. For example, in known graphics processing systems, a graphics processing module may be configured to process a stereoscopic image using two separate instantiations of sub-modules, each configured to render one of the left and right stereoscopic images. In other arrangements, it may be that the rendering of the left and right images is multiplexed, such that the left and right images are processed sequentially, i.e. one after the other. Such implementations are not optimal since they require significant additional hardware components or give rise to a lower throughput of rendered images, thereby requiring significantly faster processing capabilities.

Identifying disparity may involve performing an analysis of the geometry within a 3-D scene to be rendered and/or performing an analysis of the rendered pixel values rendered. Identifying disparity involves, identifying geometry that, when projected into left and right views, results in disparity between the rendered pixel values of left and right images. A single geometric model for a scene may be transformed and projected differently according to the different left and right viewpoints. Geometry transformed and projected for the purpose of rendering the left and right views of the scene are referred to as left geometry and right geometry respectively. By identifying disparity between left and right geometry, a determination as to which portions of the scene will result in disparity between the rendered left and right stereoscopic images can be made. Portions of the rendered images that are not disparate (i.e. do not have disparity) will have commonality and thus processing of data for these portions can be combined and commonly processed (for example can be performed only once) which reduces the amount of processing required. For portions of a scene which are identified as non-disparate, rendered values can be stored into and retrieved from memory only once (instead of twice for disparate regions) thus reducing memory usage and bandwidth between the graphics processing module and memory.

The inventor has recognised many different aspects of a traditional graphics processing module that can be optimised for stereoscopic applications which are discussed in more detail below.

Figure 3C:
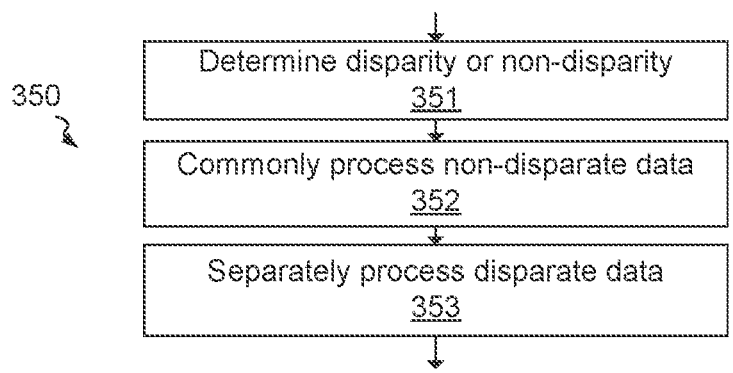
FIG. 3c shows a method of rendering a stereoscopic image.

A method 350 of rendering a stereoscopic image is illustrated in FIG. 3(c). The method begins at step 351 at which it is determined whether or not there is disparity between data in the left and right images in the scene. The determination as to whether or not there is disparity may involve comparing the location of geometry and/or the pixel values of the left and right images.

At step 352, if non-disparity has been identified between portions of the left and right images, the non-disparate portions of the left and right images can be commonly processed since the data in those portions is not disparate. By commonly processing these portions of the left and right images, data for use in displaying (e.g. rendering and displaying) left and right images can be processed so as to share results of a common process for both left and right images. At step 353, for portions of the left and right images that are identified as disparate, these portions are separately processed for the left and right images. Since the identified portions are disparate, data for left and right images may differ and thus is processed individually to generate differing results. The left data and right data that is processed either commonly or separately may, for example, be geometry data relating to the geometry in the scene as viewed from the left and right viewpoints. The left data and right data may be data relating to the pixel values generated for the left and right images. Processing the left or right data may, for example, involve tiling, rendering, processing data for storage, storing data in memory, and/or retrieving data from memory, in order to generate or prepare the left and right images of a stereoscopic image for display.

Tile Disparity

There are many different graphics processing architectures that are used. Some of the graphics processing architectures can be considered to be 'file-based' graphics processing architectures since they separate a screen-space into regions, or tiles, and process those regions separately. The inventor has recognised that efficiencies in processing and storing tiles of data in a tile-based graphics processing architecture can be made by identifying whether or not corresponding tiles for left and right stereoscopic images are disparate from one another. Disparity can therefore be tracked 'per-tile' or per region of pixels.

More specifically, the inventor has recognised that it is not necessary to store to memory pixel values for tiles in both left and right images where disparity does not result in differences in the pixel values of the images for those tiles. As illustrated in FIG. 1, in conventional approaches after the rendering phase has been completed, pixel values of the rendered image are stored in memory 150. The portion of memory 150 used to store the pixel values can be considered to be a 'frame buffer'.

Figure 4:
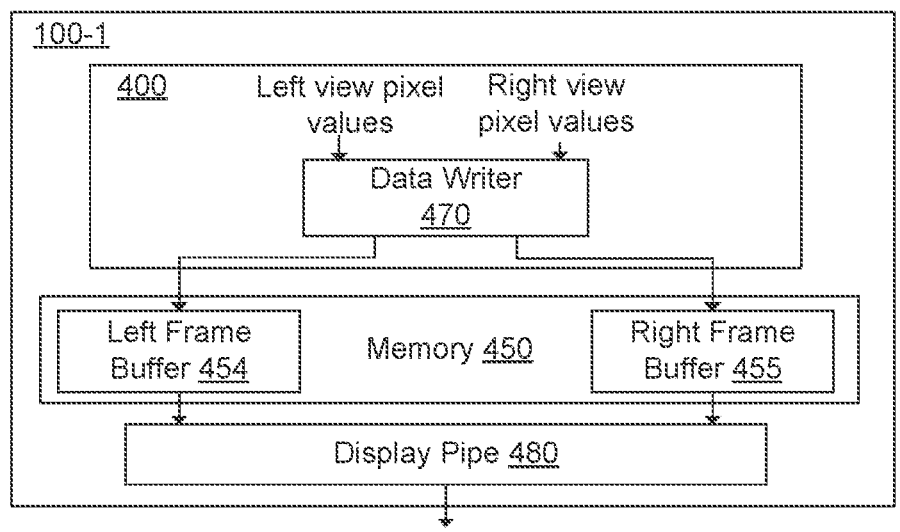
FIG. 4 shows an example of a portion of a graphics processing module configured to generate a stereoscopic image.

A portion of a computing system 100-1 comprising a graphics processing module 400 configured to generate a stereoscopic image is illustrated in FIG. 4. The graphics processing module 400 is configured to produce, during rendering, pixel values for the left and right images. Having generated the pixel values for these left and right images, the pixel values are stored in memory in respective left and right frame buffers 454, 455. In graphics processing modules, memory transactions can form processing bottlenecks or otherwise require a significant amount of power. Therefore, it is desirable to reduce the amount of data stored to be passed to and from a memory. FIG. 4 illustrates an arrangement, which can be regarded as a naïve approach, in which two separate complete sets of pixel values are stored in memory 450 (equivalent to memory 150) as left view image and right view image in separate frame buffers 454, 455, with each tile of the left image processed a tile at a time and the tiles of the right image handled separately. In this way, each set of pixel values stored in a frame buffer 454, 455 forms a complete image such that each set of pixel values can be retrieved separately from memory to wholly define an image.

Figure 5:
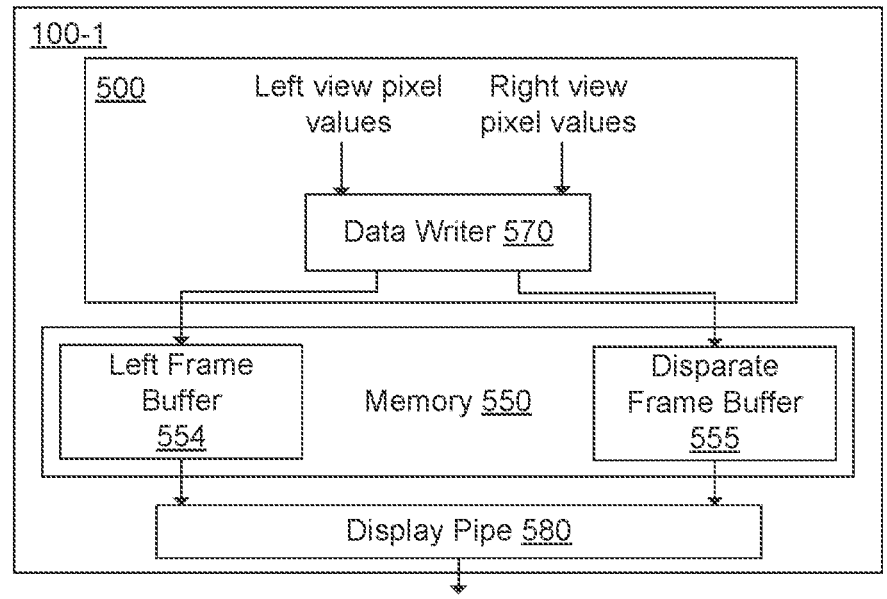
FIG. 5 shows a portion of a graphics processing module configured to generate a stereoscopic image according to an example of the present disclosure.

FIG. 5 illustrates an alternative approach for processing a stereoscopic image in a graphics processing module that is a tile-based renderer, such as a tile-based deferred renderer, in which the pixel values for the right image are processed in a different manner. References in FIG. 5 correspond to like elements in FIGS. 1 and 4. In contrast to the previously described approaches, the graphics processing module 500 is configured to process data for tiles differently based upon whether or not the corresponding tiles in left and right stereoscopic images have disparate pixel values. Additionally or alternatively, corresponding tiles of the images that do not have disparate pixel values with respect to one another may be identified and differently processed. This approach can be applied to other regions of pixels that may be grouped together and identified as disparate or not. In this way, disparity status flags per grouped region of pixels can be maintained. For example, it may be possible to arbitrarily divide a screen-space in a way that is different to the rendering granularity (e.g. different to the tile granularity). For example, blocks of pixels (such as tiles) may be grouped and flagged as disparate or not. Thus, the approach described herein is applicable generally to groups of pixels and not just tiles. In this way, the graphics processing module may separate the screen-space at a first granularity for rendering, such as into tiles. The screen-space may also be divided at a second granularity for the purposes of tracking disparity in groups of pixels. These two granularities may be the same or they may be different.

In the arrangement of FIG. 5, data writer 570 may be configured to receive (or generate) a per-tile flag indicating whether or not there exists within the tile at least one pixel value of a pixel that is identified as disparate with respect to the pixel value of the corresponding pixel in the corresponding tile of the other image of the stereoscopic image. Where a per-tile flag is received, the flag may have a value that indicates whether or not the corresponding tile (or other pre-defined block of pixels) is disparate or not. The data writer may then be able to process the block of pixels accordingly. Alternatively, the data writer may make that determination based upon the pixel values of the tile. For example, the determination may depend upon whether or not all of the corresponding pixel values in a tile or group of pixels are identical in both left and right images.

In FIG. 5, the pixel values of each tile for one of the images (in this example the left view image) are stored in memory 550 (in the left frame buffer 554) in a similar manner to FIG. 4 above regardless of whether or not disparity has been identified. The pixel values of each tile of the other image (in this example the right image), are stored in the disparate frame buffer 555 in the memory 550. The pixel values that are stored in a disparate frame buffer 555 in memory 550 may, in some implementations, not be wholly sufficient to define pixel values for the entire right image. Instead, the pixel values that are stored in the disparate frame buffer 555 are those pixel values of the right image that are present in tiles that have been identified as disparate from the corresponding pixel values in the left view tile. This determination may be made based upon the disparity flag so that only pixel values for tiles that are flagged as disparate are stored. For the one or more tiles of the right image that have been identified as not disparate from the corresponding tile of the left image, an identifier or flag may be stored that identifies that the particular tile is disparate.

A stored identifier or flag associated with each tile indicates whether the particular associated tile is disparate and may be in the form of a stored bit flag. The bit flag may be stored in either the left or disparate frame buffer 554, 555 and may have a value that indicates whether the corresponding tile is disparate or not. The bit flag may alternatively be stored in another location in memory. The amount of memory required to store the right image pixel values may therefore be less than the amount of memory required to store right image pixel values where both left and right images are processed (e.g. stored) separately. This is because the number of bits required to identify an area as not disparate is less than the bits required to store the pixel values. Instead of storing a flag, it may be possible to reference the memory location of the data in the left image, where the reference takes less memory than storing pixel values for an entire tile. Similarly, the amount of bandwidth used in reading and/or writing the right image pixel values may therefore be less than the amount of memory required to store right image pixel values where both left and right images are processed (e.g. stored) separately.

When retrieving the data from the left and disparate frame buffers 554, 555 in memory 550 for display, the pixel values of the right image are re-formed from two different sets of pixel values. Specifically, the right image is reconstructed from the pixel values of the left image from tiles (or pixel regions) that are identified as non-disparate and the pixel values of tiles (or pixel regions) that are identified as disparate and stored in the disparate frame buffer 555. The right image is therefore re-formed from the two sets of tiles, namely disparate tiles from the disparate frame buffer 555 and the non-disparate tiles from the left frame buffer 554. To reconstruct the right image, the stored per-tile flag or identifier is used to determine from which of the left and disparate frame buffers the pixel data is to be retrieved.

In this way, the pixel values stored in the disparate frame buffer are effectively the pixel values in tiles for which it has been determined that the contents of those tiles from corresponding pixel values in the corresponding tile in the other image differ due to the presence of disparity between left and right images in those tiles. In this way, it is not necessary to store the same pixel data for a tile twice, once for each stereoscopic image, into memory. The pixel values in the disparate frame buffer 555, in other examples, can be stored as delta values (differences) relative to the corresponding pixel values in the other frame buffer 554, or as a combination of motion vectors (i.e. to account for translational differences between the left and right images) and delta values with respect to the other frame buffer 554.

Figure 6:
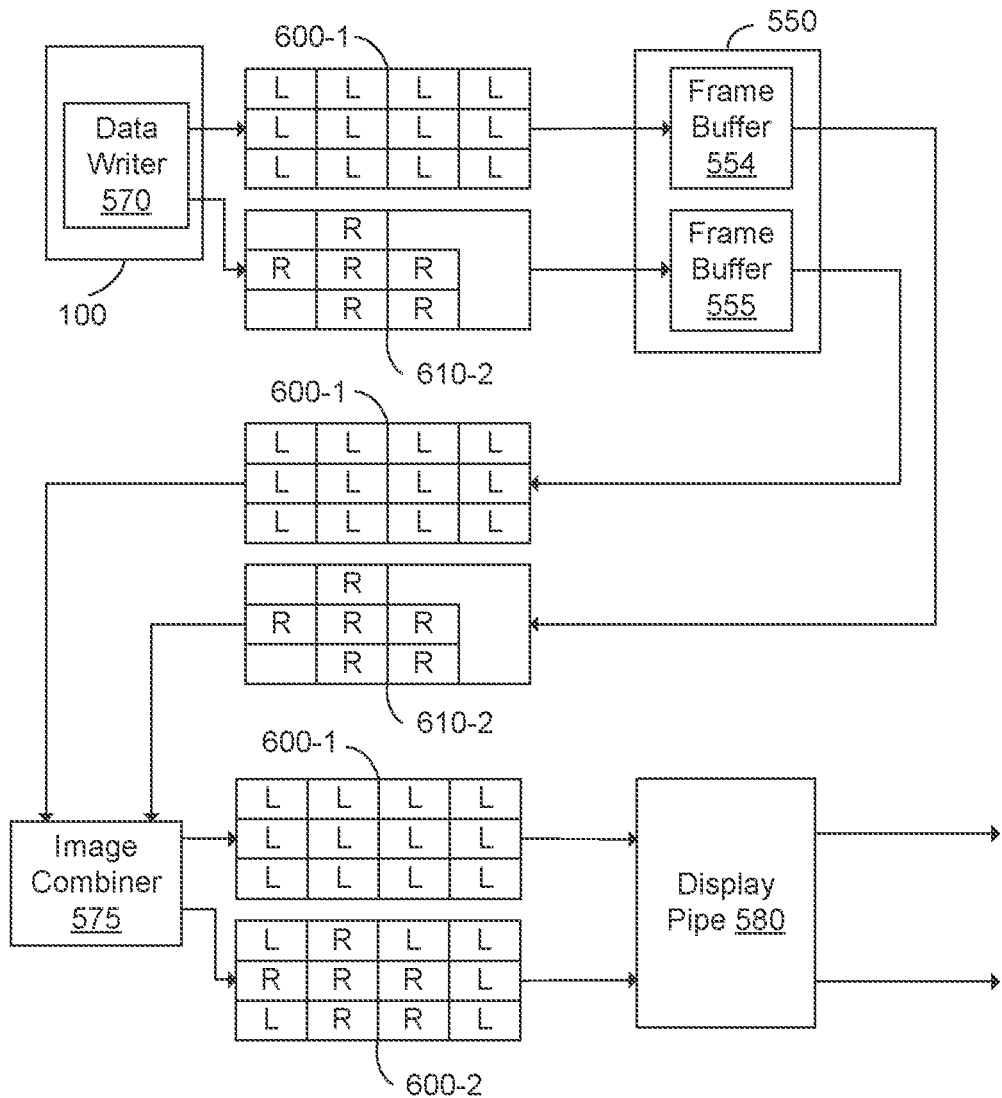
FIG. 6 shows an example data flow that can be implemented in the graphics processing module of FIG. 5.

FIG. 6 illustrates example data flow between elements in a computing system 100-1 comprising a graphics processing module 100 according to FIG. 5. The data flow occurs to write pixel values that are to be rendered for left and right images to memory 550. When the pixel values are to be displayed, the pixel values are read from memory and reconstructed into left and right images. The data writer 570 may be configured to generate the pixel data 600-1 for the left image and the disparate data 610-2 for the right image and to write the data into frame buffers 554, 555 in memory 550. The graphics processing module may also comprise an image combiner 575 (which may alternatively be separate to the graphics processing module) that is configured to perform the reconstruction of the left and right pixel data. The graphics processing module 100 may be configured to render pixel values for left and right images. In the example of FIG. 6, the pixels of the left and right images are divided into twelve tiles. In an example, the pixel values of the left and right images are passed to data writer 570 on a tile-by-tile basis. The data writer 570 is configured to receive disparity data comprising per-tile flags indicating which tiles have disparity between the left and right images. The data writer 570 is configured to process a tile based on whether or not that tile has been identified as disparate in the disparity data. Pixel data for disparate regions is prepared for storage in the disparate frame buffer 555 from memory 550. For non-disparate regions, a flag or reference to the corresponding tile in the left image may be stored in memory 550, either in the first frame buffer or second frame buffer or another part of memory.

As shown in FIG. 6, the pixel values 600-1 of the left image (labelled 'L' in FIG. 6) are stored in their entirety in the left frame buffer 554 of memory 550. In contrast, only six tiles of pixel values 610-2 of the right image (labelled 'R' in FIG. 6) are stored in the disparate frame buffer 555 in memory 550. The pixel values of the remaining six tiles of the right image are not stored in the disparate frame buffer 555. Instead, for these tiles either a flag or a reference to the left image is stored in the memory 550.

As shown in FIG. 6, the image can be re-constructed upon retrieval from memory. In particular, left 600-1 and right 610-2 pixel values are retrieved from memory 550 and passed to image combiner 575. Image combiner 575 may form part of the graphics processing module 100 or may be a separate module. The image combiner 575 is configured to reconstruct the complete pixel values 600-2 for the right image from the data stored in the memory, as described above. Then, the complete set of pixel values 600-1, 600-2 for the left and right images are passed to the display pipe 580 for display as stereoscopic images. For illustration purposes, in FIG. 6, the complete set of right pixel values 600-2 is represented by a combination of values labelled 'R', derived from the pixel values 610-2 of the right image that were stored in the disparate frame buffer 555, as well as values labelled 'L' corresponding to the same, non-disparate values, in the complete set of left pixel values 600-1 (i.e. where there were no pixel values 610-2 of the right image stored in the disparate frame buffer 555).

It will be appreciated that reference herein to "left" and "right" is illustrative to describe one possible implementation. In other approaches, references to left and right images may be arbitrarily switched such that it is the pixel values of the right image for which all pixel values are stored and it is the left image for which disparate pixel values are stored. In other implementations, the disparate values could be stored with respect to different ones of the left or right images for different tiles.

As described above, in place of the non-disparate tiles of an image being stored in memory, there may be a reference/pointer to a corresponding tile in the other image stored in memory. For example, the reference/pointer may indicate the memory location at which the non-disparate pixel data is to be found in memory 550. In this way, the image combiner 575 may be configured to retrieve those pixel values from the memory location at which the corresponding pixel values are stored for the other image. In other arrangements, references/pointers may be used for each pixel (or groups of pixels) in both frame buffers in order to represent both the left and right images. This approach requires a larger number of references/pointers to be stored in the memory, to store the pixel values that can be accessed by pointers based on references/pointers in both images.

In some arrangements, the data flow described above with reference to FIG. 6 may form part of a frame buffer compression process. For example, the data writer 570 may be integrated into a compression module of a frame buffer compression process. In this way, there will be an additional step of compressing the pixel values before they are stored in memory 550. Image combiner 575 may similarly form part of a frame buffer decompression process which returns the original pixel values by performing a decompression of the pixel values as well as re-forming the images.

In some alternative arrangements, it may be possible to store three types of values representing the pixel values to be used in the final frame. For example, it may be possible to represent the pixel values of the left and right images using three types of pixel values, namely left, right, and common pixel values. In principle, storing values in this way allows pixel values unique to the left image to be stored as left pixel values, and unique pixel values for the right image as right pixel values. Pixel values which are common to both images, at a particular pixel location, may be stored as common pixel values and thus only need to be stored once.

Accordingly, in an alternative approach for storing the pixel values to memory that can be used in the present disclosure, three separate buffers may be utilised. Instead of having a frame buffer in which all of the values for a single image are stored and a second buffer in which only the pixel values that are disparate to corresponding values in the other image, pixel values common to both left and right images can be stored in a single buffer. For example, a "common" buffer may store pixel values that are correspondingly common to left and right images (i.e. pixel values that are non-disparate), a "left" buffer may store pixel values for the left image that are disparate from the right image, and a "right" buffer may store pixel values for the right image that are disparate from the left image. In this way, the pixel values stored in the "common" buffer can be used to effectively complete the left and right images as the values are read from memory. This approach could be used in place of the two frame buffer approach in this description.

The above-described approach enables disparity between left and right stereoscopic images determined on a tile-by-tile basis to be used in reducing the amount of data that needs to be stored to memory. The approaches set out above require knowledge of the disparity status of the tiles. The inventor has further recognised that the disparity data that indicates whether or not corresponding tiles are disparate can be determined in one of a number of different ways. For example, it is possible to identify the presence or absence of disparity based upon geometry information for left and right images, i.e. whether or not the location of one or more elements of geometry differ in screen-space between the left and right images. Alternatively or additionally, disparity between left and right images can be determined based on a difference between corresponding pixel values in the left and right images.

Identifying Disparity from Pixel Values

As described above, it is possible to identify the absence or presence of disparity between corresponding left and right images based upon a comparison of corresponding pixel values in the left and right images.

Figure 7:
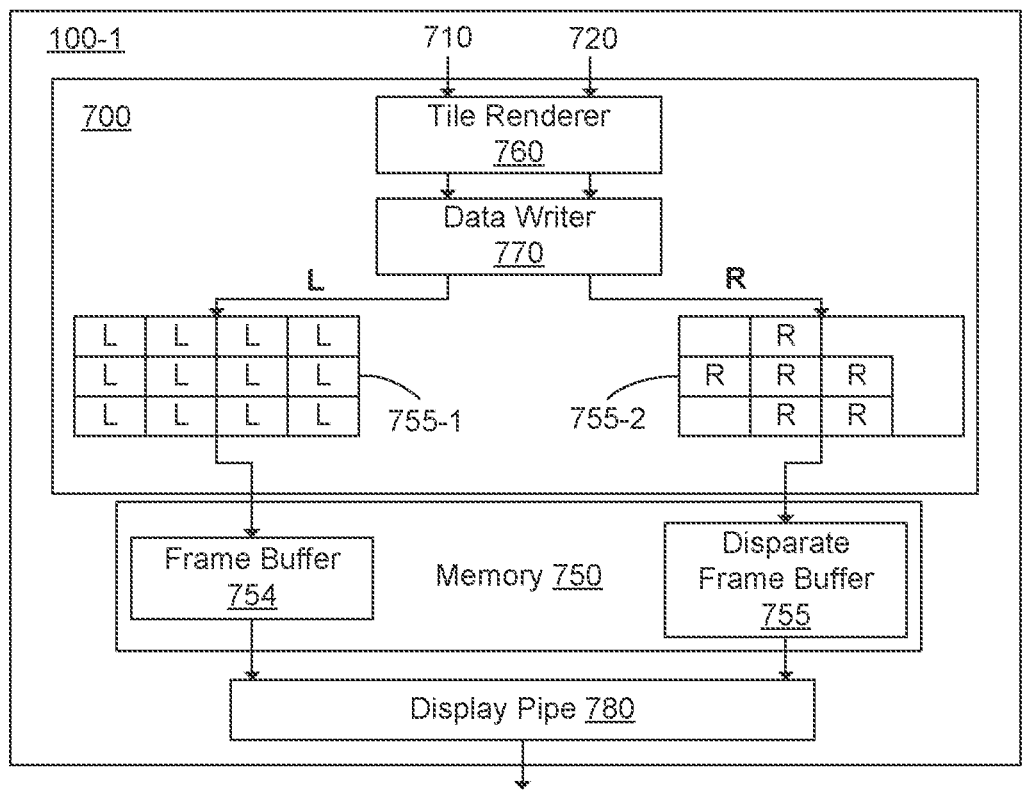
FIG. 7 shows a portion of a graphics processing module configured to generate a stereoscopic image according to an example of the present disclosure.

FIG. 7 illustrates a portion of a computing system 100-1 comprising a graphics processing module 700 according to an arrangement of the present disclosure that is configured to identify differences in pixel values and to generate disparity data based upon those differences. The graphics processing module 700 is configured to perform rendering of stereoscopic images. The graphics processing module 700 comprises a tile renderer 760 that is configured to receive two streams of geometry, namely a left stream of geometry 710 and a right stream of geometry 720. The left and right streams of geometry may respectively comprise elements of geometry, such as vertex locations for primitives in the scene to be rendered from a viewpoint (either left or right). In some arrangements, the tile renderer 760 is configured to process the left stream of geometry to render pixel values of the left image and process the right stream of geometry to render pixel values of the right image. The specific operation of the tile renderer will depend upon the specific architecture of the graphics processing module. Where the tile renderer 760 forms part of a tile-based deferred renderer, the tile renderer may initially make a determination as to which primitive (or primitives) in the stream of geometry are visible at a pixel position (or sampling point) and then determine, from an associated texture, which colour is to be rendered at that point. In contrast, a tile renderer 760 in an immediate mode renderer will render each primitive which is received and then determine which of the rendered primitives is visible at a given pixel value (or sampling point). In general, the operation of the tile renderer 760 involves determining what element of geometry (or elements of geometry in the case of translucent objects) is visible at each pixel location and determining what colour value is to be rendered for that element of geometry. As a result, the tile renderer 760 determines the pixel values for each pixel of each of the left and right stereoscopic images. The determined pixel values for both left and right stereoscopic images can be used to identify whether or not disparity is present.

In the arrangement of FIG. 7, the determination as to whether or not there is disparity based on the pixel values determined at each pixel position can be performed by the tile renderer 760 or the data writer 770 (or another module). For example, tile renderer 760 may be configured to pass the rendered pixel values for respective left and right stereoscopic images to the data writer 770 which is configured to identify disparity between the left and right images. Alternatively, after rendering the pixel values of the left and right images, the tile renderer 760 may be configured to determine whether there are any differences in corresponding pixel values between the left and right images.

The identification of disparity between left and right images may be performed based on a plurality of group of pixels. As mentioned previously, the groups of pixels upon which disparity is determined may or may not correspond with the granularity used to perform the rendering. For example, a group of pixels used to identify a portion of the images as disparate may correspond with a tile. The group of pixels may alternatively be larger or smaller than a tile. The identification of disparity may alternatively be performed on a pixel-wise basis—such that each pixel is identified as disparate or non-disparate. Where there are differences in the pixel values, the tile renderer 760 may be configured to flag that pixel or a group of pixels (such as a tile) as disparate.

Where a group of pixels is identified as disparate when compared with a corresponding group of the other image, the pixel values for those groups of pixels are separately written to memory as described above with reference to FIG. 6. Where no disparity is identified between pixel values in a group of pixels, the pixel values in the group of pixels are commonly processed, e.g. by only storing the pixel values in the group for one of the stereoscopic images in memory with a flag/reference indicating that the group of pixels is not disparate, for example as described above with reference to FIG. 6. The pixel values of that group of pixels in the other image are not separately stored, and may be replaced with a flag or a reference that indicates that the pixel values for that group of pixels should be retrieved from the memory location where the corresponding pixel values for the other image are stored. Accordingly, memory bandwidth and usage is saved. For example in FIG. 7, the pixel values for the left image are stored as 755-1 in the frame buffer 754 in the memory 750. Further the pixel values for the right image, for a group of pixel values with disparity are stored as 755-2 in the disparate frame buffer 755 in the memory 750. When the image is to be displayed, it is retrieved from memory 750 and passed to a display pipe 780 for final processing before it is displayed. An image combiner is not shown in FIG. 7. Where an image combiner is not shown, the equivalent functionality may be assumed to be integrated into the display pipe module, e.g. display pipe 780.

For a given group of pixels, the pixel values of that group are compared with the corresponding pixel values of pixels in the corresponding group in the other image in the stereoscopic image. Where the tile renderer 760 determines that the pixels of a group of pixels for a stereoscopic image are such that they would be perceptibly different (or unacceptably perceptibly different), the group of pixels is deemed to be disparate. Specifically, this may involve a comparison of each colour channel (e.g. RGB) with the respective colour channel of the corresponding pixel.

It will be appreciated that there are a number of different approaches in which a group of pixels can be identified as disparate. For example, it may be that, for a group of pixels, any difference in pixel values (e.g. a difference in the least significant bit of a colour value) between a single pixel in the left image and the corresponding pixel in the right image is sufficient to indicate that the group of pixels that includes that single pixel (e.g. a tile) is disparate. Alternatively, it could be that a threshold difference is identified. For example, if a pixel value for a given pixel in a stereoscopic image differs from the corresponding pixel value in the other stereoscopic image by more than a threshold amount then that group of pixels is deemed to be disparate. This threshold would then allow for an imperceptible difference in pixel value or an acceptable perceptible difference in pixel value to be ignored. As another alternative, it may be possible to make a determination about the disparity of a group of corresponding pixels (e.g. a tile) based on the magnitude of the difference in pixel values between left and right stereoscopic images over the group of pixels. For example, a measure of the average (e.g. the mean) difference may be used to determine whether or not that group of pixels is to be flagged as disparate or non-disparate. As another alternative, the determination of the disparity of a group of pixels could be based on the number of corresponding pixels within the group which are different (i.e. disparate) between the left and right images. For example, this number of pixels could be compared with a threshold (e.g. which may be equal to one or may be greater than one) to determine whether to classify the group of pixels as disparate or not. In a further alternative, the determination of the disparity of a group of pixels may be based on the spatial distribution of disparate pixels. For example, a cluster of disparate pixels may be considered to be a stronger indicator of a disparate group than if the same pixels were distributed uniformly. In general, the determination of the disparity of a group of pixels may be any function of the individual pixel value differences, and the position of those pixels within the group.

When determining whether or not there is disparity between left and right images of a stereoscopic image by comparing the rendered pixel values of the left and right images, it may be determined that some difference between corresponding pixel values is acceptable. This is because the disparity in pixel value may be so small as to be imperceptible (or acceptably perceptible) if the implementation has an acceptable perceptible difference. Accordingly, corresponding pixel values in left and right images may be regarded as not disparate despite a small difference in their colour values. A threshold may be set that defines at which level the pixel values are to be regarded as so disparate as to be separately stored in memory.

Identifying Disparity from Geometry

As set out above, the identification of the presence or absence of disparity may be determined based upon pixel values. Alternatively or additionally, the identification of the presence or absence of disparity may be determined based upon a difference in geometry data between the left and right images. The geometry data may include different position data for elements of geometry that are present in the left and right images. Accordingly, disparity between objects may have been determined prior to rendering which allows the graphics processing module to avoid unnecessarily rendering geometry that is not disparate for both left and right images. For disparate geometry, disparity between elements of geometry (such as primitives) can be identified and the disparity status can be maintained at different levels of granularity. For example, where disparity is determined based on geometry data, disparity status can be maintained per-pixel, per-object, per-tile, and/or per-group of tiles. Since non-disparate data can be commonly processed, it is possible to commonly process at a per-pixel, per-object, per-tile, and/or per-group of tiles granularity.

Figure 8:
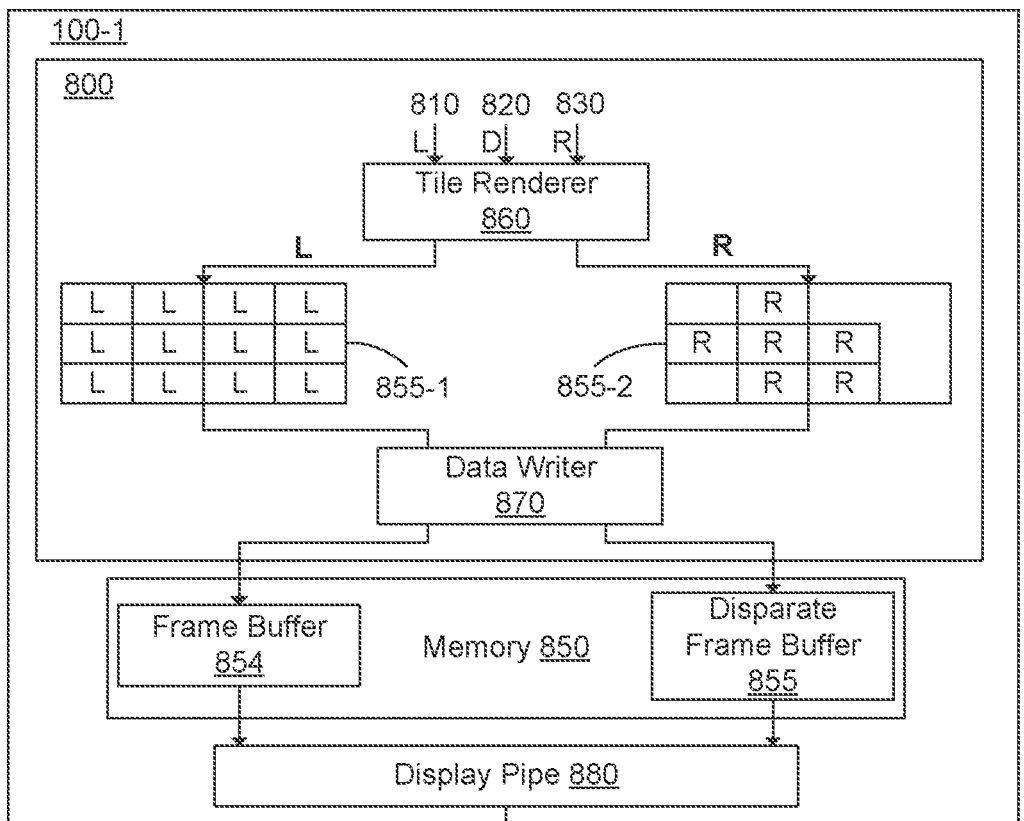
FIG. 8 shows a portion of a graphics processing module configured to generate a stereoscopic image according to an example of the present disclosure.

FIG. 8 illustrates a computing system 100-1 comprising a graphics processing module 800 in which disparity has previously been determined (and which is described in more detail later) based upon the position of the geometry present in the left and right views of the scene. Graphics processing module 800 comprises a tile renderer 860 and a data writer 870. As discussed above, in this arrangement the tile renderer 860 is configured to receive two streams of geometry, namely a left stream 810 and a right stream 830, as well as disparity data 820. The disparity data identifies whether or not there is disparity between the position of geometry in the left and right streams of geometry. In some arrangements, this disparity data may indicate the disparity status (e.g. disparate or non-disparate) for a region of screen space (e.g. per tile or group of tiles). In this way, where objects have been found to be disparately located, the region or regions (e.g. tile or tiles) in which the object is at least partially located can be flagged as disparate. In this arrangement, processing of the pixel data may proceed as described previously and illustrated in FIGS. 5 and 6. Where disparity is not identified, the savings in the memory bandwidth and usage may occur but there is still a cost in rendering the objects.

In some arrangements where there is no disparity in the location of geometry present in a particular region of a screen space (e.g. tile), it can be assumed that the rendered pixel values in that particular region in the left and right stereoscopic images are the same. In this way, it is possible to skip the rendering of that region for either the left or right images of the stereoscopic image. This is because it can be assumed that the same element of geometry will be rendered on both regions. The pixel values for the region for only one of the images are rendered. For the corresponding region in the other image, the pixel values can either be directly replicated to the corresponding region of the other image or the approach set out in FIG. 6 can be used to re-form the other image using an image combiner. This reduces the amount of processing required in rendering the image. The manner in which the disparity between geometry in a region of the image is determined will be described in more detail later.

The approach described above relates to tracking disparity per-region of the left and right images based upon identifying disparity from left and right screen-space geometry. Disparity can also be identified based upon the location of objects in the left and right screen-spaces and tracked on a per-object basis. In this way it is possible to identify individual objects that are disparately located and to determine whether or not to render the object separately or commonly for both left and right images based upon that determination.

In this arrangement, the disparity data 820 is configured to include a number of flags that indicate which of the elements of geometry has a disparate location in one image of the stereoscopic image with respect to its location in the other image of the stereoscopic image. The tile renderer 860 is configured to receive the per-object disparity information to enable the tile renderer 860 to identify which objects in received left and right geometry streams 810, 830 are not disparate and to process the objects commonly. In an example, image regions in both left 855-1 and right 855-2 images in which disparate objects are to be rendered are processed separately for each image. However, for objects that are non-disparate, the objects are only processed once. For example, in some rendering architectures the pixel values for pixel positions that the object intersects may only be generated once—e.g. for the left image. For the right image, a flag indicating disparity or a reference to the pixel values generated for the object in the left image are stored—for example, in place of the pixel values. These pixel values and/or flags are then stored to memory, for example in frame buffers 854, 855 and displayed via a display pipe 880. In this way, the total amount of rendering required to generate pixel values for both left and right images is reduced. An object as described herein can be considered to be an element of geometry, such as a primitive.

Disparity in Tile-Based Deferred Rendering

Figure 9:
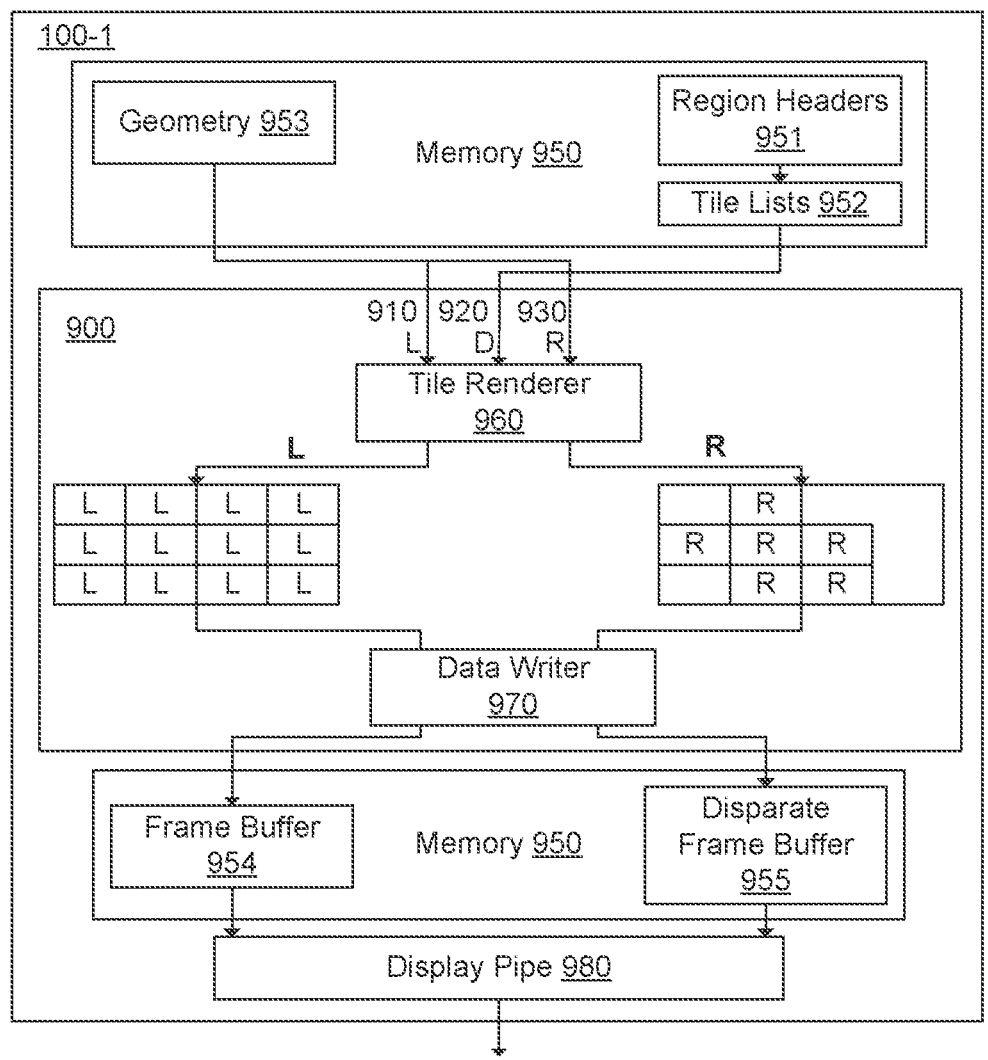
FIG. 9 shows a portion of a graphics processing module configured to generate a stereoscopic image according to an example of the present disclosure.

FIG. 9 illustrates an example arrangement in which a computing system 100-1 comprising a tile-based graphics processing module 900 is configured to retrieve, from memory 950, stored geometry 953 in the form of left 910 and right 930 geometry streams and tiling data from region headers 951 and tile lists 952, that includes disparity data 920 that includes flags that indicate disparity either per tile or per-element of geometry. The tile lists 952 indicate, for each tile, which primitives are at least partially located in the tile. As mentioned previously, the region headers 951 contain information relating to a region of the screen-space that is to be rendered for each of the left and right images. For example, the region headers 951 may each relate to a tile or group of tiles and may contain data common to that tile or group of tiles. In the example of FIG. 9, the region headers 951 may contain a flag or indicator for each region, for example for each tile, that may indicate for each tile whether there is geometry in that tile (defined in the tile list 952 for that tile) that is disparate for one of the left or right images with respect to the other image. In this manner, the disparity data indicates disparity per-tile or per-group of tiles. The per-tile or per-group of tiles disparity data can be stored in a portion of memory 950 other than the region headers 951.

From the disparity flags, it can be determined which tiles or groups of tiles contain geometry which has been identified as disparate in the left and right screen-spaces. Where a tile does not contain disparate geometry, it is only necessary to render the tile once (for example, for the left image). For such tiles, the tile renderer 960 is configured to determine from the tile lists 952 the primitives that are at least partially located in a particular tile. For each pixel position in the tile, it is determined which primitive is to be rendered by determining which primitive is closest by comparing the depth value of each primitive with a depth value stored in a depth buffer. When a newly received primitive is received that replaces the previous closest primitive at specific pixel locations as the closest primitive, a tag buffer may be updated to reference the newly received primitive at those pixel locations to reflect the change and the corresponding depth value at those pixel locations is updated in the depth buffer. For non-disparate tiles, the process of depth testing need only be performed once. For disparate tiles, this testing of depths of geometry is performed separately for left and right pixel values based respectively on the primitives in the left and right streams of geometry. In this way, the amount of rendering required can be reduced for arrangements in which there is no disparity between geometry in the left and right images.

Having rendered pixel values for left and right images, the data writer 970 in the graphics processing module 900 may be configured as illustrated in FIG. 9 to write the pixel data for the left view image to frame buffer 954 in memory 950, along with disparate image portions of the right image in the disparate frame buffer 955. Alternatively, the tile renderer 960 may be configured to wholly construct the right image from the rendered portions of the right image (that are disparate) and the non-disparate portions of the left image prior to the pixel values being stored to memory 950. This approach may result in additional memory requirements but can reduce the amount of image reconstruction required before image data is passed to the display pipe 980.

In an implementation, the disparity data 920 may be stored along with the geometry data 953 in memory 950 instead of with region headers 951 or tile lists 952. In this way, the disparity data may indicate which objects are disparately located from the corresponding object in the other image. The tile renderer 960 is configured to receive tile lists indicating the geometry at least partially present in each tile. It is therefore possible to determine whether a particular tile contains disparate geometry by checking the disparity data for each element of geometry. If an object in a tile list is deemed disparate, then the tile may be considered to be disparate and can be processed as described above in relation to FIG. 9 accordingly.

By storing disparity data in memory 950 on a per-object basis, it is possible to perform geometry compression to reduce the amount of geometry that needs to be stored. For example, in the approach described above with reference to FIG. 9, both left and right streams of geometry are stored to memory. Where disparity data is stored with geometry, it is possible to commonly process non-disparate geometry data and store non-disparate geometry once—since the coordinates of the geometry are the same (or imperceptibly different) for both left and right images. Disparate geometry would be separately processed, and corresponding disparate left and right geometry would need to be stored separately. The compressed geometry can then be decompressed based upon a determination as to whether or not that geometry is disparate. If the geometry is not disparate, the commonly stored geometry data can be used for left and right images. Where the geometry is disparate, the separately stored left and right geometry data can be respectively used for left and right images.

Rendering Using Per-Pixel Disparity Status

Figure 11:
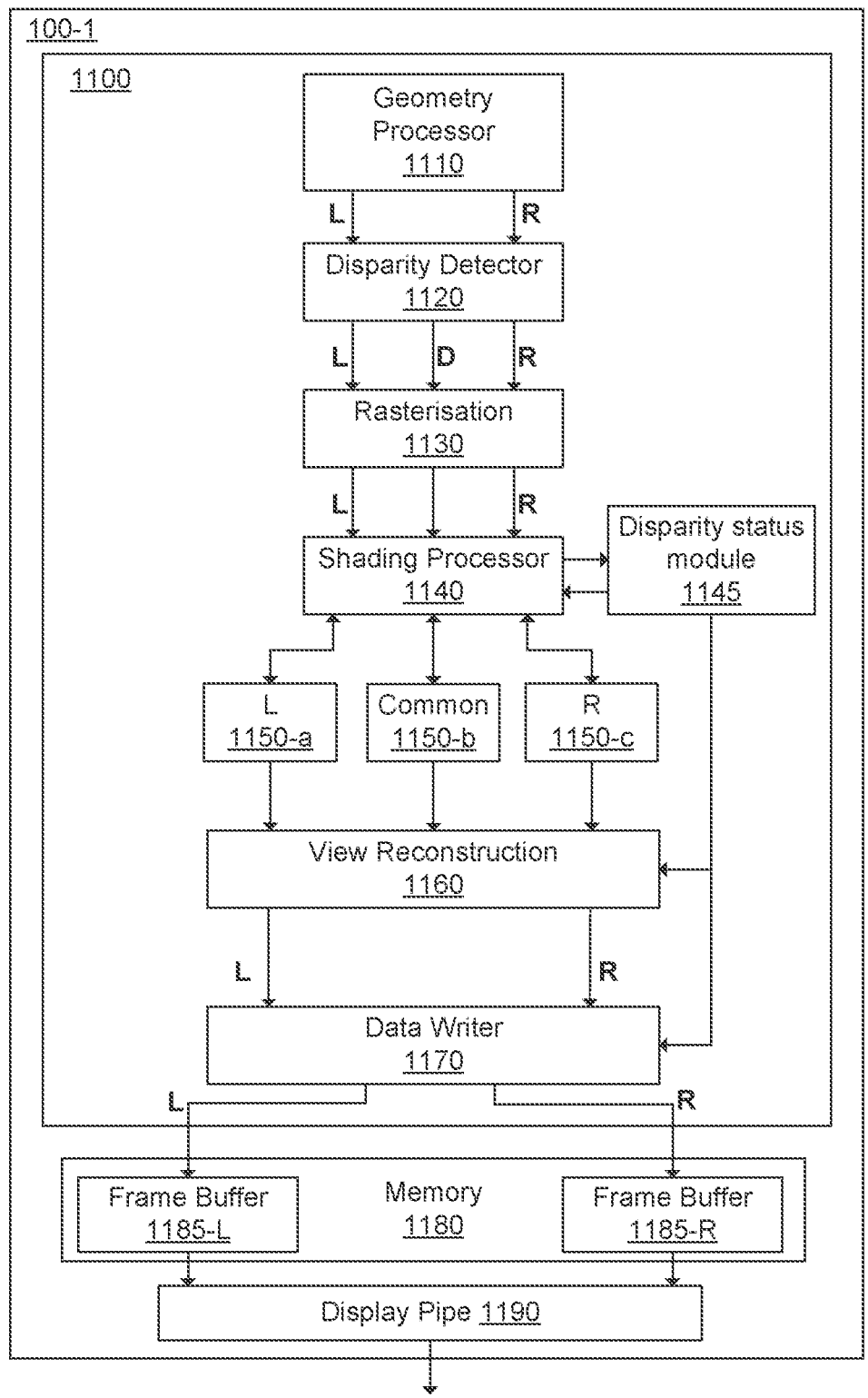
FIG. 11 shows a graphics processing module configured to generate a stereoscopic image according to an example of the present disclosure.

As described above, it is possible to reduce the processing required to render pixel data by identifying disparity between objects on a per-object basis. In FIG. 11, a computing system 100-1 comprising a graphics processing module 1100 is illustrated that identifies disparity per-object and maintains a disparity status on a per-pixel status. The graphics processing module 1100 comprises a geometry processor 1110 that is configured to perform geometry processing in order to generate separate left and right streams of geometry, a disparity detector 1120 configured to identify disparity on a per-object basis between the left and right streams of geometry to generate disparity data, a rasterisation module 1130 configured to perform a process of rasterisation based upon the geometry and the disparity data to generate fragments for a visible object at each pixel, a shading processor 1140 configured to perform shading (e.g. texturing and blending) for each fragment to generate pixel values, a disparity status module 1145 configured to track disparity status for a number of different pixel values, output buffers 1150 (comprising a left output buffer 1150-*a*, a common output buffer 1150-*b*, and a right output buffer 1150-*c*) configured to hold pixel values, a view reconstruction module 1160 configured to reconstruct image frames based upon the pixel values held in the output buffers, and a data writer 1170 configured to write pixel data out to memory 1180. The previously described tile renderer may, in some arrangements, be implemented by the rasterisation module 1130, shading processor 1140, and disparity status module 1145. Graphics processing module 1100 may be configured to store pixel data to memory 1180. When the image is to be displayed, it is retrieved from memory 1180 and passed to a display pipe 1190 for final processing before it is displayed.

As will be appreciated, in some graphics processing module architectures, the streams of geometry that are passed to the rasterisation module are processed in a number of passes to generate partial renders, for example due to the constraints on internal memory resources. In some graphics processing modules it may not be possible to render the scene in one pass. For example, where memory is required to store processed geometry, it may be that internal memory fills and is thus flushed of its contents before any further processing can take place. After the first batch of geometry is processed, the visible pixel values at each pixel location are stored to the output buffers and the earlier modules in the pipeline are flushed of their values. A subsequent batch of geometry for that same frame of the same scene may then be processed. Then, the pixel value data from the output buffers may be loaded back into the shading processor 1140 for blending so that the pixel values loaded from the shading processor are combined or processed in combination with the values generated by the shading processor 1140. The pixel values processed by the shading processor are stored back into the output buffers.

In this way, the geometry to be processed in a scene can be handled in batches and the resultant pixel values can be combined together to generate the pixel values for the image. It is therefore possible to handle a large amount of geometry with limited memory resources. By following this approach, the graphics processing module is configured to store intermediate or temporary pixel values for each of the left and right images to be rendered, which places an additional burden on the output buffer size of the graphics processing module. For example, where a subsequent object in a subsequent batch is deemed to be located closer than previous objects at the same screen-space position, the subsequent object in the subsequent batch is to be rendered in place of the visible object from the previous batch and thus the pixel values at which the subsequent object is present are updated. A prior approach to handling this is to retain a buffer for each of the left and right images in which the most recent pixel values are to be stored. These stored values can then be updated if appropriate as and when new geometry data is received for a particular pair of stereoscopic images.

The inventor has recognised that it is possible to make use of the determined disparity data in order to reduce the internal memory requirements to store intermediate or temporary pixel data by determining whether or not it is necessary to store separate left and right pixel values. This is achieved, for example, by maintaining disparity status on a per-pixel basis based upon disparity identified based upon geometry data. Specifically, where there is no disparity between corresponding left and right pixels, it is not necessary to store the pixel values twice. Similarly, where there is disparity between left and right corresponding pixel values, separate pixel values for the left and right images may be stored. As mentioned above, when pixel values for both left and right images are stored, values in one image may be encoded based upon values in the other, e.g. as delta values (differences) relative to the corresponding pixel values in the other image, or as a combination of motion vectors (i.e. to account for translational differences between the left and right images) and delta values with respect to the other image.

Geometry processor 1110 is configured to process received geometry in order to generate two streams of geometry, namely a left stream of geometry in the scene having coordinates relating to a left viewpoint and a corresponding right stream of geometry of the scene having coordinates relating to a right viewpoint. The two streams of geometry are passed to a disparity detector 1120 that is configured to determine, for primitives in the left and right streams whether or not there is disparity between the locations of the corresponding primitives. The geometry processor 1110 is configured to process the received stream of geometry and to output processed left and right geometry streams. The coordinates of the processed geometry are translated into a screen-space coordinate system, which is defined in terms of an (x,y) coordinate within the screen-space of each of the left and right viewports. In some arrangements, the geometry processor 1110 is configured to generate two effective streams of geometry, one set of geometry having coordinates defined in terms of a left viewpoint (herein a "viewport") and another set of geometry having coordinates defined in terms of a right viewpoint. In some arrangements, the geometry processor 1110 may be configured to generate only a single stream of geometry comprising two sets of coordinates, namely a left set of coordinates relating to the left viewpoint and a right set of coordinates relating to the right viewpoint.

In an example, disparity detector 1120 may be configured to determine disparity between objects. The sets of coordinates for the left and right primitives generated by the geometry processor 1110 are passed to the disparity detector 1120 that is configured to calculate, for each primitive/object that appears in both the left and right streams of geometry, a disparity metric, D, that indicates the degree of disparity in position between a primitive/object in the left and the corresponding object in the right stream. The term "streams of geometry" is a functional definition of the left and right sets of geometry generated for the left and right images. The geometry may be provided as a single stream or separate physical streams of geometry.

In stereoscopic imaging of a scene, a primitive/object will only exist once in that scene but that primitive may have different coordinate values in each rendered image, as illustrated in relation to FIG. 2. Moreover, in some arrangements it may be that a primitive is only present in one of the left and right images. In this circumstance, the primitive/object would be present in one of the streams of geometry and not in the other. For example, a primitive may be present in one image of a scene and not the other (for example due to culling of objects). Accordingly, the order in which the primitives are presented in the two streams may not directly correspond (this may also be the case where no primitives are omitted). Furthermore, for a particular element of geometry in a stream of geometry, it may not be possible to identify a corresponding object/primitive in the other stream of geometry. Where a primitive has been omitted, there may be a lack of correspondence between sequentially received primitives in each stream.

To determine the disparity, D, the elements of geometry present in the left and right streams may therefore be tracked to ensure a correspondence. For example, each primitive passed from the geometry processor 1110 may have an associated identifier. The disparity detector 1120 may be configured to identify corresponding primitives in each of the left and right streams based upon the identifiers. After corresponding primitives have been identified, the disparity detector is configured to compare the position of the primitives in the two-dimensional screen-space of each image to identify a difference in position. One approach to comparing the relative positions of the primitives is to determine an absolute distance between each of the corresponding vertices of the primitive and to compare this absolute distance to a threshold value, $\theta_{disparity}$, as set out below:

$$\|L(x,y)-R(x,y)\| < \theta_{disparity}$$

where $L(x,y)$ is the x,y coordinate of a vertex of a primitive in the left primitive stream, and $R(x,y)$ is the x,y coordinate of the corresponding vertex of the corresponding primitive in the right primitive stream. The threshold value, $\theta_{disparity}$, may be set to the largest imperceptible (or largest acceptable) difference in position for a primitive. In other exemplary cases, the threshold value $\theta_{disparity}$, may also differ based on the z coordinate or surface normal values. The value of $\theta_{disparity}$, may vary for different applications. The value of $\theta_{disparity}$, may vary based on the performance and/or quality trade off required for different application. The position of a primitive may differ between left and right views, e.g. due to the different positions of the viewpoints from which the scene is viewed. This difference may not result in a perceptibly different position in the final rendered images. In some arrangements, for each of the primitives for which a comparison of the distance between the x,y coordinates of corresponding vertices for left and right images is performed with the $\theta_{disparity}$ threshold, a flag value may be generated that indicates, for that primitive, whether or not that the primitive is disparate with respect to the location of the corresponding primitive in the stream of geometry.

The flags (or indicators) for a plurality of objects (or primitives) form disparity data, D, that is output from the disparity detector 1120 to the rasterisation module 1130. In some arrangements, the disparity data, D, may form a separate set of data or, in other arrangements, the disparity data may be integrated into the left and/or right streams of geometry output from the disparity detector 1120, for example as associated disparity bits or flags. In some examples, the disparity indicators for the primitive streams may take the form of a separate binary stream that indicates whether or not each primitive is disparate. In some arrangements, the data transmitted in the primitive streams emitted by the disparity detector 1120 may include an additional bit indicating the disparity indicator for that primitive.

In some implementations, the threshold value may be configured to vary between primitives/objects. For example, the threshold value may depend on the size of the primitive. In some arrangements, it may be possible to determine whether or not the position of any of the vertices of a primitive differs between left and right primitive streams by an amount greater than the threshold value (or the threshold value for that primitive) in order to determine that the primitive is disparately located. In other arrangements, it may be possible to sum the differences for each of the vertices of the primitive and, if the summed differences are greater than the threshold amount, then determine that the primitive is disparate. Accordingly, for each primitive that is passed from the disparity detector 1120, an indication as to whether or not there is disparity between the location of the primitive in the two streams is also output.

As described above, in some implementations the number of primitives present in the left and right primitive streams may differ. In this way, there may be primitives for which there is not a corresponding primitive in the other stream. Accordingly, this situation, a disparity indicator might not be used to indicate that a primitive of one primitive stream is disparately located relative to a corresponding primitive of the other primitive stream. Instead, it may be that the disparity indication for the primitive indicates that the primitive is distinct because there is no corresponding primitive in the other primitive stream for the other viewpoint. For example, it might not be possible to establish a correspondence between a primitive in one of the two geometry streams and a primitive in the other geometry stream. In this circumstance, the disparity indicator may indicate that the primitive is disparate from the primitive in the other stream without having to perform a comparison of relative vertex positions. A different flag indicator may be used to distinguish between primitives that are present in both left and right primitive streams, but are disparate in position, and primitives that are considered to be disparate because there is no corresponding primitive present in the other stream.

The outputs from the disparity detector 1120 are therefore left and right streams of geometry and disparity data for each object in the streams of geometry. The outputs from the disparity detector 1120 are passed to the rasterisation module 1130 which is configured to perform a process of rasterisation. As part of the rasterisation process, the left and right geometry is processed to generate, for left and right images, visible fragments. The visible fragments may be determined, for example, by performing depth tests of the received primitives to determine, for each of a number of pixel locations, which element of geometry from the respective streams of geometry is visible at each pixel of each of the left and right stereoscopic images. This may involve maintaining a closest depth value and an index to the closest primitive for each pixel location, which is then updated each time a closer primitive is identified at that pixel location. Once determined, the rasterisation module 1130 is configured to output fragments to a shading processor to determine a pixel colour value for each fragment. It will be appreciated that the precise order and operation of this module will depend upon the specific architecture of the graphics processing module. In the example of an immediate mode renderer, the rendering may be performed before determining which object is closest whereas a deferred renderer may first determine which object is closest before texturing based on the identified object.

Once completed, the fragments are passed to the shading processor 1140, which is configured to render a value (e.g. a colour value) for each fragment, for example by applying to each visible fragment one or more texture values (e.g. colours) associated with the primitive from which that fragment was generated. The shading processor may also be configured to programmatically modify the texture or fragment values. It will be appreciated that the fragment values that are generated by the shading processor 1140 do not necessarily directly correspond to the pixel values of the final left and right images. For example, the visible primitives from which the fragment values are determined may not be entirely opaque (i.e. they may be translucent). As such, opacity data relating to each object may be tracked and thus, on a per-pixel basis, the shading processor 1140 may blend each fragment's values with those of previously rendered fragments to generate pixel values for the left and right images. Furthermore, additional batches of geometry may be passed from geometry processor 1110 that result in an update to the pixel values.

Figure 10:
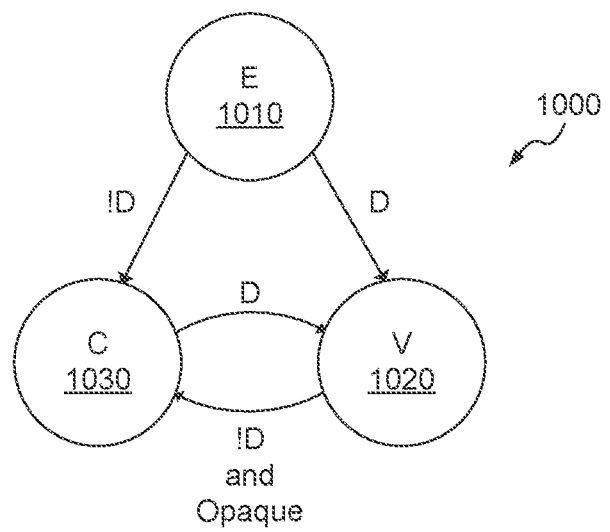
FIG. 10 shows a state transition diagram for determining the disparity status for a pixel.

Due to the additional processing of pixel values, the graphics processing module 1100 may be configured to store temporary pixel values during the processing performed by the shading processor 1140. The temporary pixel values may be stored in temporary storage internal to the graphics processing module, namely one of three output buffers 1150-*a*, 1150-*b*, or 1150-*c*. In order to determine in which of the three output buffers pixel values should be temporarily stored, a disparity status is tracked on a per-pixel basis. Disparity status module 1145 is configured to track the disparity status for each pixel position of the left and right images. The disparity status may be tracked for each pixel position of a tile at a time, where the graphics processing architecture is tile-based. Alternatively, the disparity status may be tracked across the entire image. In some arrangements, the disparity status module 1145 is configured to track the disparity status of each pixel based on a state transition diagram as illustrated in FIG. 10.

The disparity status module 1145 is configured to identify the disparity status for each pixel. FIG. 10 illustrates a state transition diagram for the disparity status of each pixel. The disparity status for a pixel may be one of three disparity statuses, namely Empty (E) 1010, Common (C) 1030, and View (V) 1020. The Empty state indicates a state in which there is no pixel value stored at that pixel and thus there is no disparity status stored. For example, at the start of rendering a particular frame, the disparity status of each pixel may be reset to state 'E' to indicate that the pixel has no pixel value associated with it. For example, the pixel may be a default colour—e.g. a clear colour. Then, for a particular pixel, the disparity status may be set to either 'V' or 'C'. The state transitioned to from state 'E' 1010 will depend upon the value from the disparity data D associated with the element of geometry that was determined to be visible at the pixel. For example, if the corresponding value of the disparity data D indicates that there is no disparity between the element of geometry in the left image and the corresponding element of geometry in the right image, then it can be assumed that the resultant pixel value to be displayed in the left image can also be displayed in the right image.

Accordingly, if there is no disparity between corresponding pixel values of left and right images, the same pixel value can be used in both images. In that way, a single common pixel value can be stored. Therefore, if a first value to be written to a pixel location derives from an element of geometry that is not disparate from its counterpart element of geometry, the disparity status flag for that pixel location is set to common 'C'. The pixel value is therefore stored once in the common output buffer 1150-*b* and not in the left output buffer 1150-*a* or the right output buffer 1150-*c*. For a first value to be written to a pixel location, if the pixel value to be written to that location derives from an object that is disparate (either because there is no corresponding object in the other image or due to a difference in location between the elements of geometry between images), then the disparity status for that pixel location is set to view 'V'. As can be seen in FIG. 10, the disparity status flag for a pixel location is changed from empty 'E' 1010 to view 'V' 1020 when disparity is detected. When the disparity status for a pixel location is set to V, the left and right pixel values associated with the pixel location are stored separately in the left and right output buffers 1150-*a* and 1150-*c*.

As described above, the graphics processing module may be configured to process received geometry in separate passes. The values in the output buffers may therefore be re-loaded into the shading processor to be updated before being loaded back into output buffers. For a particular pixel position, it may be that the disparity status of pixel values at pixel positions for a scene is changed during the rendering of a frame. For example, some geometry located close to the viewports may not have disparity and may be opaque, such that the previous geometry to be used in the final rendered scene is disparate but some closer geometry which does not experience disparity replaces the previous geometry.

To move a pixel from a view 'V' disparity status to a common 'C' disparity status, it should be determined that, for that particular pixel, there is no disparity between the object to be rendered in the left and right scenes at that pixel location (i.e. they can be rendered in the same way) and that the object that is visible at that pixel is opaque. This data can be tracked through the pipeline of the graphics processing module. The opacity of the object is tracked and checked since, if the object is translucent, then the previous pixel value at that pixel location contributes in some degree to the final pixel value. Since the previous pixel value between the left and right images differs (as a result of disparity), the values are separately stored in the left and right output buffers 1150-*a* and 1150-*c*. Where the nearest object is translucent and the object located behind the nearest object is disparate, the resultant blended pixel is also disparate between left and right images. Accordingly, separate left and right values should be stored and thus the disparity status remains to be view 'V'. However, in some implementations a translucency threshold can be applied, such that an object with a translucency below the threshold is considered so close to opaque that any disparity introduced by the previous pixel values at the pixel location for the left and right images will not be perceptible, or will be small enough to ignore. In that scenario, an object with a translucency below the threshold can be treated in the same way as an opaque object.

Transition from the common state 'C' 1030 to the view state 'V' 1020 occurs when a new nearest object is determined and that object is determined to be disparate. Such a transition does not require knowledge of the opacity of the object nearest to the viewport from which the scene is to be rendered. Since the new object has disparity, it is necessary to separately store the left and right pixel values, regardless of the opacity of the object. For example, where the object is opaque, the new object solely contributes to the pixel value. In this way, the new object pixel value is disparate and thus needs to be stored separately. Where the object is translucent, a process of blending occurs between the non-disparate colour value and the disparate colour value. However, the result of blending these colour values will be different in the left and right images since the objects are disparately located. The pixel values are therefore stored separately in left and right output buffers.

The memory resources needed to commonly process non-disparate pixel values, i.e. store the temporary pixel values in a common output buffer, is therefore reduced with respect to an approach in which the pixel values for each image are processed separately, i.e. the pixel values are stored separately in left and right output buffers. By operating in this way, pixel values for non-disparate objects are only stored once in the common buffer. After the geometry for a scene has been rendered and the resultant images are generated and written to memory 1180, the two separate images need to be reconstructed from the three output buffers 1150-*a*, 1150-*b*, and 1150-*c*. View reconstruction module 1160 uses the disparity status for each pixel to reconstruct the left and right images. Specifically, the disparity status module 1145 is configured to pass to the view reconstruction module 1160 the per-pixel disparity status values.

If the disparity status for a pixel location is set to 'E' (empty), the view reconstruction module 1160 need not retrieve a pixel value from an output buffer since there is no value to retrieve. The view reconstruction module 1160 therefore populates the pixel location with a clear or default value. If the disparity status for a pixel location is set to 'V' (view), the pixel values for the left and right images are pixel values of disparately located objects. As such, the values are separately stored in the left and right output buffers 1150-*a*, 1150-*c*. The view reconstruction module 1160 therefore retrieves the left and right pixel values from respective left and right output buffers. If the disparate state for a pixel location is set to 'C' (common), the pixel values for the left and right images are stored only once in the common output buffer 1150-*b* since there is no disparity between the objects in the left and right images. Accordingly, for common pixels the view reconstruction module 1160 is configured to retrieve the corresponding pixel values from the common output buffer 1150-*b*. The view reconstruction module 1160 is configured to load the same, common pixel value in both corresponding pixel locations of separate left and right images. Once completed, the view reconstruction module 1160 may have generated completed left and right images.

As illustrated in FIG. 11, the two images may be passed to data writer 1170, which may correspond with the data writer illustrated in other Figures. The data writer may be configured to store each complete image to a respective frame buffer 1185-L, 1185-R in memory 1180. Alternatively, in some arrangements the data writer may be able to make use of approaches described in FIGS. 5 to 9 to store a complete image of a first image of the stereoscopic images and disparate portions of the other image of the stereoscopic images as previously described. In some cases, therefore, the reconstruction module 1160 may be omitted, and the common and disparate portions of the stereoscopic images may be written to memory 1180 directly.

Figure 12:
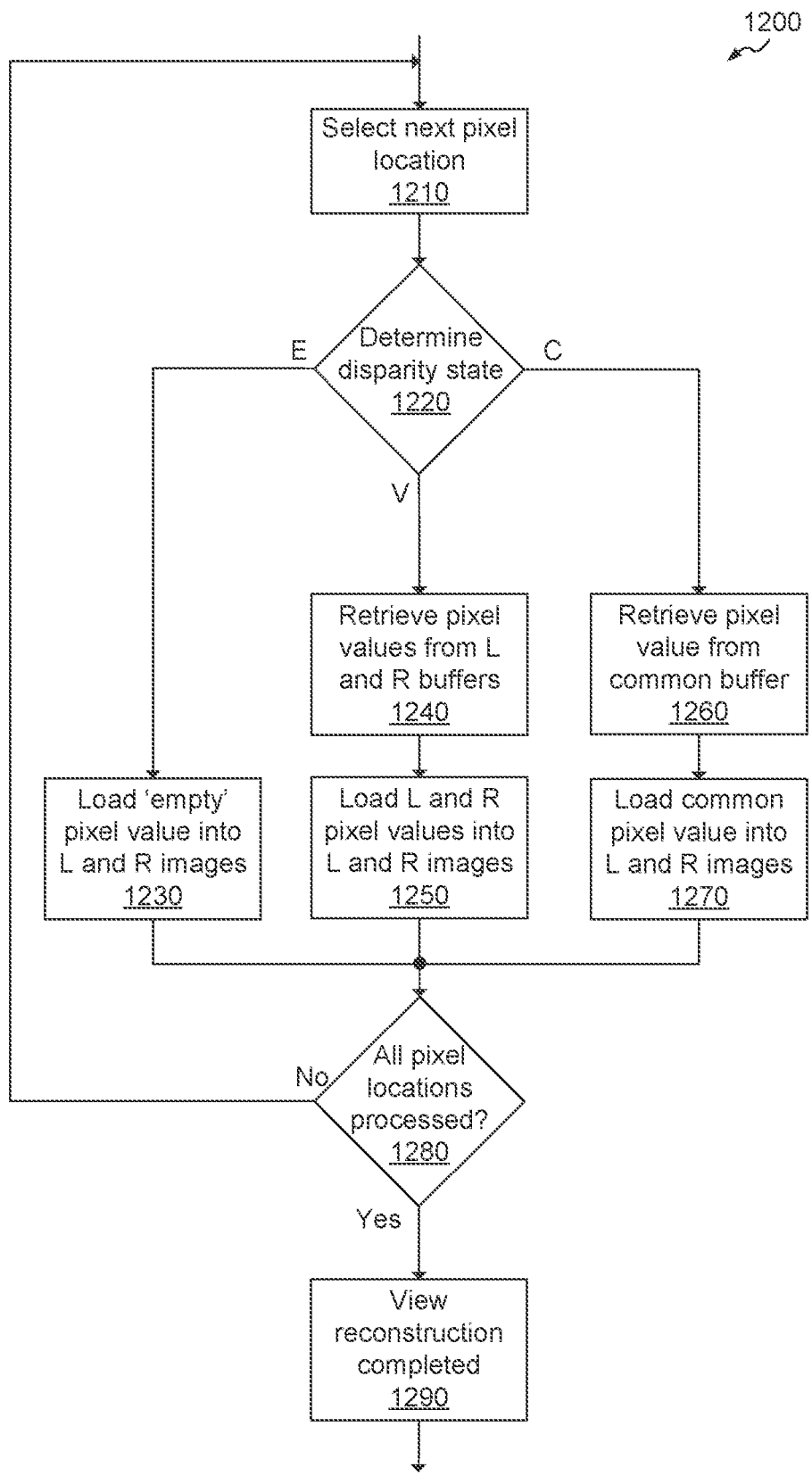
FIG. 12 shows a process for performing view reconstruction.

FIG. 12 illustrates a process 1200 for performing view reconstruction that can be performed by the view reconstruction module 1160. At the start of the process a pixel location is selected for processing 1210. After a pixel location has been selected, a disparity status value for that pixel location is determined at step 1220. The disparity status value for that pixel location is determined to be one of 'E' (empty), 'V' (view), and 'C' (common). If the disparity status value for that pixel is determined to be empty, E, the process 1200 proceeds to step 1230 at which a value indicating a clear colour (i.e. a default colour) is loaded into the corresponding pixel location of both the left and right images. Having completed step 1230, the process proceeds to step 1280. If, at 1220, the disparity status value for that pixel location is determined to be 'V' (view), the process 1200 proceeds to step 1240 at which the separate left and right pixel values are respectively retrieved from separate left and right output buffers. The process 1200 proceeds to step 1250 at which the separate left and right pixel values are loaded into the left and right images. Once step 1250 is completed, the process 1200 proceeds to step 1280. If, at 1220, the disparity status value for the pixel location is determined to be 'C', the process proceeds to step 1260 at which the common pixel value for the pixel location is retrieved from the common output buffer 1150-*b*. At step 1270, the retrieved common pixel value is stored into the corresponding pixel locations in both left and right images.

At step 1280, it is determined whether or not all of the pixel locations for the image being reconstructed have been processed. If so, process 1200 proceeds to step 1290 at which the view reconstruction process is completed and the final left and right images are stored to memory. If there are pixel locations that have not yet been processed, the process 1200 returns to step 1210 at which the next pixel location to be processed is selected. The process is then repeated for the next pixel location until all pixel locations have been processed. Having completed this approach, the complete images may be passed to a data writer to handle the writing of the completed images to memory.

Rendering from Geometry Disparity in a Tile-Based Deferred Renderer

Figure 13:
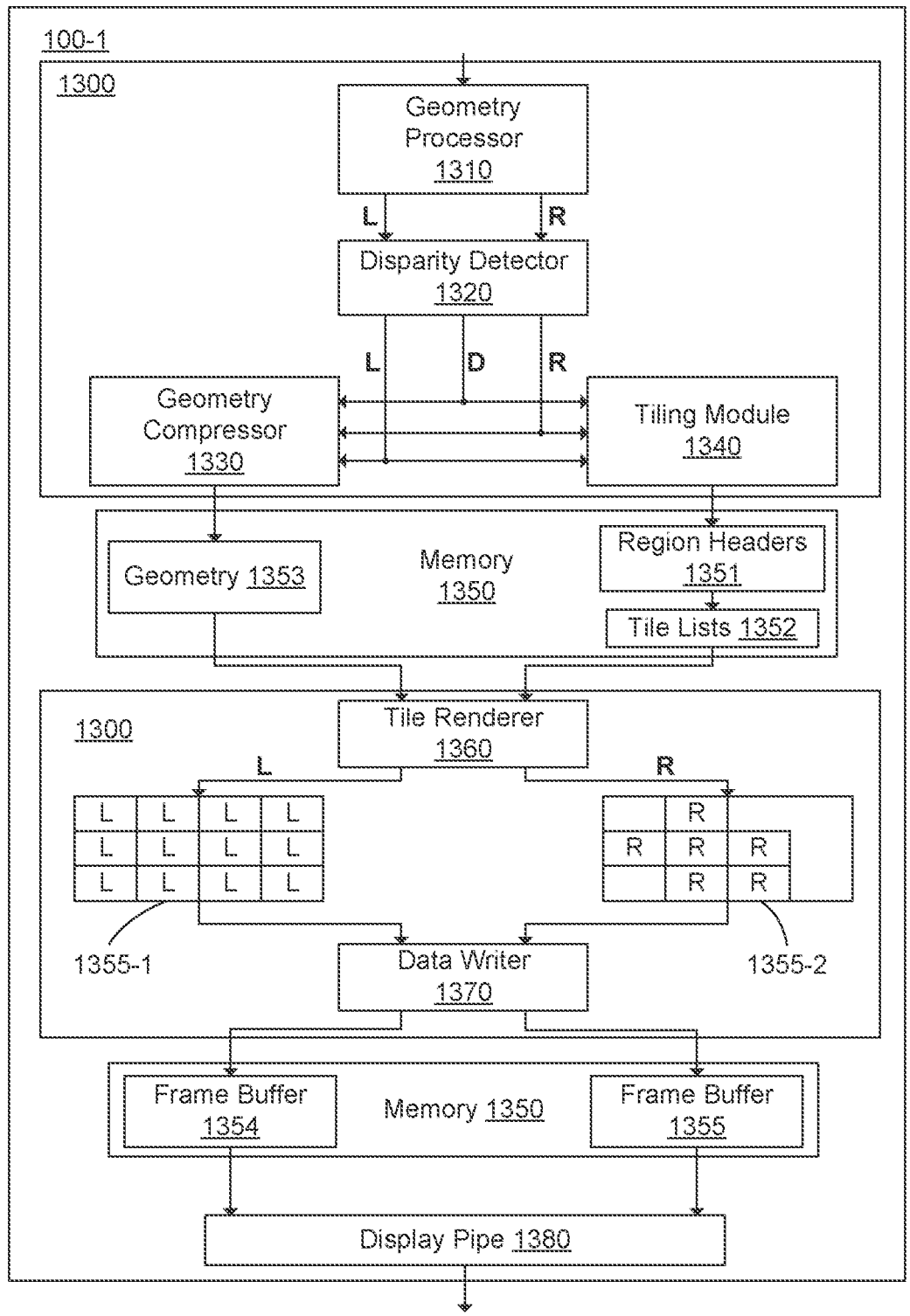
FIG. 13 shows a graphics processing module configured to a generate stereoscopic image according to an example of the present disclosure.

FIG. 13 illustrates a computing system 100-1 comprising an example graphics processing module 1300 configured to render left and right stereoscopic images using a TBDR rendering approach. The graphics processing module comprises a geometry processor 1310, a disparity detector 1320, a geometry compressor 1330, a tiling module 1340, a tile renderer 1360, and a data writer 1370. Like elements correspond to those illustrated in earlier figures.

The graphics processing module 1300 relates to the TBDR graphics processing module of FIG. 1 but has been configured to identify disparity and process the data for displaying left and right images according to the identification of disparity. Specifically, the graphics processing module 1300 comprises a disparity detector 1320 that is configured to perform disparity detection on the left and right streams of geometry received from the geometry processor 1310 in a manner as previously described. The disparity detector 1320 is configured to pass to a geometry compressor 1330 and a tiling module 1340 left and right streams of geometry and disparity indicator information D.

The geometry compressor 1330 may be configured to make use of the disparity indicator information D in order to perform geometry compression. For primitives in the left and right streams of geometry that do not have disparity, it is possible to store in memory 1350 a single copy of data defining the primitive. Since there is no disparity between the primitives, the locations of the vertices of these primitives are the same (or are so similar as to result in imperceptible (or acceptably perceptible) differences in the rendered images). For such primitives, instead of storing the primitives twice, once for each of the left and right geometry streams, the primitive is stored once along with metadata data indicating that the primitive has the same data in both the left and right images. This additional data may take the form of a flag associated with the stored geometry. For disparate geometry, it may be necessary to separately store the left and right geometry. For example, the (x,y) coordinates of the primitive may be stored for the left geometry stream and, for the right geometry stream, offset values may be stored. The offset values may indicate the difference in position in a primitive from the left and right streams and requires less memory to store as well as fewer bits to transfer to and from memory than storing full values. Further, non-positional information, for example, texture coordinates, shader programs, and other rendering information, may be common between corresponding primitives in the left and right geometry streams, even when the (x,y) coordinates of the primitives indicate disparity. In these cases, the primitive in, for example, the right geometry stream, may make reference to some or all of the non-positional information of the corresponding primitive in the left geometry stream.

The tiling module 1330 is configured to perform a tiling operation, as is known in tile-based graphics processing pipelines. In particular, the tiling module 1330 is configured to divide a screen space into portions, referred to as tiles, and to determine in which tiles each primitive is at least partially located. The result of the tiling process performed by a conventional tiling module may be a plurality of tile lists. A tile list comprises a list of identifiers of all of the primitives that are at least partially located within that tile. Each tile list may be associated with a particular tile and may include an identifier of each primitive that is located in that tile. For stereoscopic images that include a set of geometry for the left image and a set of geometry for the right image, the tiling module 1330 may be configured to perform a separate tiling process for each of the left and right primitive streams. The screen-space of each of the left and right images may be portioned into tiles and, for each tile of each of the left and right screen-spaces, a tile list may be generated. In some arrangements the left screen-space and the right screen-space may be partitioned in the same manner such that there is a direct one-to-one correspondence between tiles in each screen-space. In this way, a left tile list and a right tile list may be generated for each tile.

In some arrangements, the tiling module 1340 may be configured to generate a different set of tile lists in the circumstance where there is a direct one-to-one correspondence between tiles in the left and right screen-space. In particular, in some arrangements three separate tile lists may be generated. For example, as well as a left tile list and a right tile list, a third common tile list could be generated. In a similar manner to that described above with reference to FIG. 11, for a given tile—a left tile list may indicate the objects that are present in the tile for the left image and not the corresponding tile of the right image, a right tile list may indicate the objects that are present in the tile for the right image and not in the corresponding tile of the left image, and a common tile list may list objects that are present in corresponding tiles for both left and right images.

It is noted that efficient rendering can rely on processing primitives in a correct sequence. Where primitives are allocated to different left image/right image/common tile lists, there is potential for the correct sequence to be lost. However, steps can be taken to ensure the correct processing sequence is maintained. For example, one solution would be to allocate each primitive a unique incrementing ID value before tiling. When, for example, rendering the left image, the left and common lists would be considered, and the system could simply compare the ID of the primitives at the next position in each list, and select for processing the one with the lowest value. A similar solution could use memory addresses. A tile list entry may be essentially a pointer to an address where geometry data is stored. The system could be configured such that geometry data is always stored at increasing memory addresses, and then the addresses themselves can be used as the sequence IDs.

As part of the tiling process performed by the tiling module 1340, a region header is generated and stored in region header 1351 in the memory 1350. The region header comprises information relating to a particular region of the screen-space. For example, the region header may relate to a single tile or a plurality of tiles and may comprise information relevant only to that region. In an example, the region header may comprise, for each tile in that region, a flag that indicates whether or not there is a primitive/object in that tile that has been flagged as disparate. When processing elements of geometry in a stream of geometry, the tiling module 1340 may be configured to determine whether or not, for each tile, a primitive that is at least partially located in that tile has been flagged as disparate in position from the corresponding primitive in the other primitive stream. If this is the case, the corresponding region header which is associated with that tile is also flagged as disparate. Accordingly, the difference between the described tiling approach and the tiling approaches used previously is that there is tracked, for each region (e.g. a tile or block of tiles), a flag that indicates whether or not there is some disparity between at least one primitive in an image from a viewpoint when compared with the corresponding primitive in the image from the other viewpoint. The region headers 1351 and the tile lists 1352 generated in the tiling module 1340, are passed from the tiling module to memory 1350 for storage.

Having stored the geometry 1353, region headers 1351, and tile lists 1352 in memory 1350, the graphics processing module 1300 is configured to process this data in a rendering phase. Rendering in AR and VR applications using stereoscopic images involves generating separate left and right images. In the present application, the rendering phase may include the step of performing rasterisation so as to generate pixel values for both left and right images. In a tile-based deferred rendering process, the rasterisation is performed independently for tiles. To do this, the tile lists 1352 (for left and right streams) are retrieved from memory 1350, for example with left and right tiles being processed in an interleaved manner or sequentially so that all left tiles are completed before all right tiles are processed. For a particular tile, the primitives listed in the tile list of that tile are processed to determine at which pixel location(s) (or sampling point location(s)) primitives appear.

Having determined the pixel locations at which the primitive is located, a depth value for the primitive is compared to a stored depth value in a buffer, referred to as a depth buffer. The depth buffer indicates a depth value for each pixel location (or sampling point location) and represents the nearest identified depth value associated with that pixel location. A depth test is performed by comparing the depth value for the primitive/object currently being processed and the depth value currently stored in the depth buffer. Where the currently processed primitive has a shallower depth than the currently stored depth value in the depth buffer (i.e. the primitive is located in front of the previously nearest primitive), the identity of the currently processed primitive replaces the identity of the stored primitive at that pixel location in a tag buffer. In addition, the depth value in the depth buffer at that sampling point is updated to reflect the new depth value of the nearest value.

In naïve implementations of stereoscopic applications, the rendering process is repeated for geometry data for the left image and geometry data for the right image, either a tile at a time or for the complete left and right images of the stereoscopic images, one at a time. In this way, rendered pixel values may be generated for each tile of each of the left and right images. As shown in FIG. 13, tile renderer 1360 is configured to receive geometry 1353, region headers 1351, and tile lists 1352 and to generate rasterised pixel values on a tile-by-tile basis.

By taking into consideration the degree of disparity between the left and right images, it is possible to reduce the amount of processing required to render the left and right images, as well as potentially reduce the amount of pixel value data to be stored to external memory. As mentioned above, a naïve approach to rendering left and right images is to perform the rendering process in its entirety for the left and right streams of geometry or to interleave the processing of left and right streams of geometry through a single pipeline. However, the stored disparity may indicate whether or not a particular tile includes any primitives that differ in location with respect to the corresponding primitives in the corresponding tile.

In the event that there is not disparity between the primitives in a tile for one of the two screen-spaces and the other, it can be determined that the same rendered tile may be used in the resultant left and right images of the stereoscopic image. This might occur, for example, where the objects present in that tile are located at a large distance from the viewpoints. For example, the tiles may include objects in the background of a scene that do not perceptibly alter in position between left and right viewports. In this way, it is possible to render the tile once for one of the two streams and to elect not to render the corresponding tile for the other stream. As described above, in the case that the view directions are parallel, there may be a small translational shift in the position of an object between the left and right images due to the distance between the two viewpoints. However, this translational shift may be small enough to not perceptibly alter (or small enough to alter to an acceptably small degree) the position of objects between the left and right images, such that the objects can be treated as being non-disparate.

In the example of FIG. 13, the output of the tile renderer is two sets of rendered pixel values for each tile. In naïve approaches, each output would include a complete set of pixel values that represent the entire left image and a corresponding complete set of pixel values that represent the entire right image. In FIG. 13, two sets of tiles (or references to tiles) 1355-1, 1355-2 are generated by the tile renderer 1360. A first set of tiles 1355-1 is generated for the left image. The first set of tiles 1355-1 comprises twelve tiles (each marked that, in this example, form the entire left image. Each tile comprises pixel colour values that form an image region. A second set of tiles 1355-2 is also generated by the tile renderer 1360. In the example of FIG. 13, the second set of tiles 1355-2 includes six tiles and thus does not, in itself, wholly define the right image. In this example, it has been determined that the remaining six tiles, that have not been rendered, did not contain any primitives that were flagged as disparate. Accordingly, the region headers 1351 relating to these tiles are not flagged as disparate and the tile renderer 1360 does not therefore need to render this tile.

In the example of FIG. 13, a complete set of pixel values that represent the entire left image are output. For the right image, however, not all of the tiles are processed. For tiles that are not deemed to be disparate, instead of duplicating the rendering for that tile, the tile is replaced with a flag or reference indicating the corresponding tile in the left image is to be used. This is particularly advantageous in the graphics processing pipeline since it is not necessary to duplicate the processing required to render the tiles. As will be explained in more detail below, the memory requirements and memory bandwidth requirements for handling this form of representing the left and right images may be reduced.

Optionally, the reduced format described earlier of the left and right images may be used for storing the images to memory 1350. However, this is not necessary and it may be possible to reconstruct the complete image before storing the image to memory.

Figure 14A:
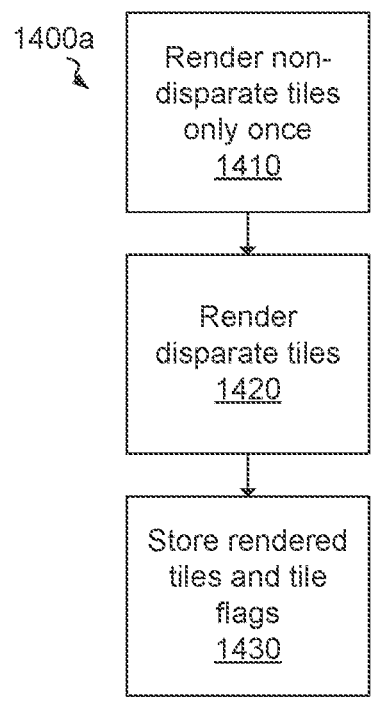
FIG. 14(*a*) shows a method of storing reduced format images to memory.

FIG. 14(a) illustrates a method 1400a of storing the reduced format images to memory. The method is configured so that, following identification of disparate and non-disparate tiles (being examples of groups of pixels), the tiles for non-disparate pixel values are stored for a first one of the left and right images. In step 1410, the non-disparate tiles are rendered only once. Consider that the non-disparate pixel values are stored for the right image. In step 1420, the disparate tiles of both the first image (i.e. right image) and the other image of the stereoscopic image (i.e. the tile of the left image that was not selected and processed at step 1410) are rendered. Although the figure shows a sequence of non-disparate tiles (step 1410) and then disparate tiles (step 1420) being rendered, this is an example only. In other examples, the disparate tiles of the first image may be rendered at the same time as the non-disparate tiles, or even before the non-disparate tiles, for example.

For tiles that are not disparate, the tiles are commonly processed during step 1410. For these tiles a flag is set indicating that the pixel values for this tile are common to both images and should be used for both images. For tiles that are deemed to be disparate, these tiles should be rendered separately using the rendering process described above. For disparate tiles, the pixel values are separately processed at step 1420, i.e. they are separately stored in memory. Once all of the tiles of the images are processed, at step 1430, the pixel value data and tile flags are stored in the memory 1350. Accordingly, a complete representation of the image can be reconstructed based upon the pixel values in the memory 1350.

It will be appreciated that the amount of memory resource and rendering saved by this approach will depend upon the nature of the scene being rendered and the objects in that scene. For example, in the event that there is no disparity between the left and right images, it is not necessary to perform any rendering during step 1420. In this way, step 1420 may be skipped. Then, during step 1430 only tile flags (or optionally a single flag indicating all tiles) can be stored in memory. In another alternative scenario, it may be that each of the tiles has disparate geometry. In this scenario, it is not possible to save any render processing or memory resource since each tile of both images must be separately rendered and stored in their entirety in memory. This is because there is no commonality across any tile of the left and right images.

Figure 14B:
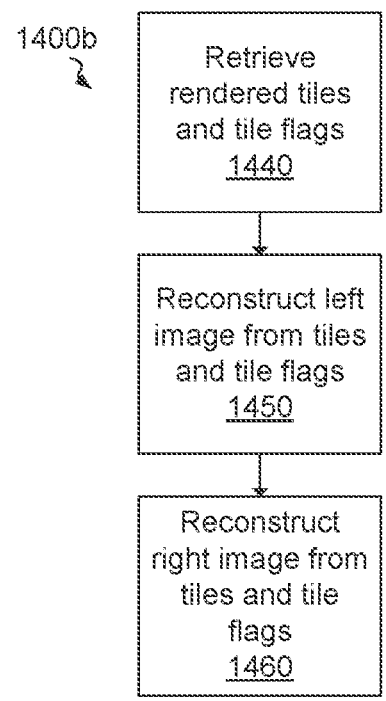

FIG. 14(b) illustrates a method of retrieving from memory the data stored using the method of FIG. 14(a) and reconstructing the resultant images to be passed to the display pipe of the graphics processing pipeline. Specifically, in an example, the method 1400b comprises retrieving, at step 1440, the rendered tiles and tile flags from memory. The method further comprises reconstructing, at step 1450, a left image based upon the stored tiles and the tile flags. The reconstruction of the stereoscopic image comprises combining the tiles identified as disparate with tiles identified as non-disparate based upon the tile flags. The reconstructed stereoscopic image is therefore collectively defined by disparate and non-disparate tiles. At step 1460, the corresponding right image is reconstructed based upon the stored tiles and the stored tile flags, in a similar manner to the left image.

The image reconstruction method set out above applies, for example, to arrangements in which two frame buffers are used—i.e. a frame buffer for storing a complete image and a disparate frame buffer for storing disparate values for the other corresponding stereoscopic image. As previously described, another arrangement is envisaged in which three frame buffers are used instead of two—namely a common frame buffer, a left frame buffer, and a right frame buffer. The method of FIG. 14(a) can also be applied to the three buffer arrangement. The pixel values that are correspondingly the same (or imperceptibly different) in left and right images can be stored in the common frame buffer, and disparate pixel values for left and right images can be respectively stored in left and right frame buffers. The reconstruction method may comprise retrieving the pixel data from left, right, and common frame buffer and reconstructing the left and right images based on the retrieved pixel data. Specifically, the left and right images may be populated with common pixel data and the remaining pixel data to complete the images may be retrieved from respective left and right frame buffers. The reconstructed left and right stereoscopic images can then be output for display. The tile flags may be stored in the common frame buffer to indicate that the pixel values are to be retrieved from separate left and right buffers. Additionally or alternatively, the tile flags may be stored in the left and right buffers which indicate that pixel values should be retrieved from the common frame buffer.

Generating Left and Right Views in a Geometry Processor

Figure 15:
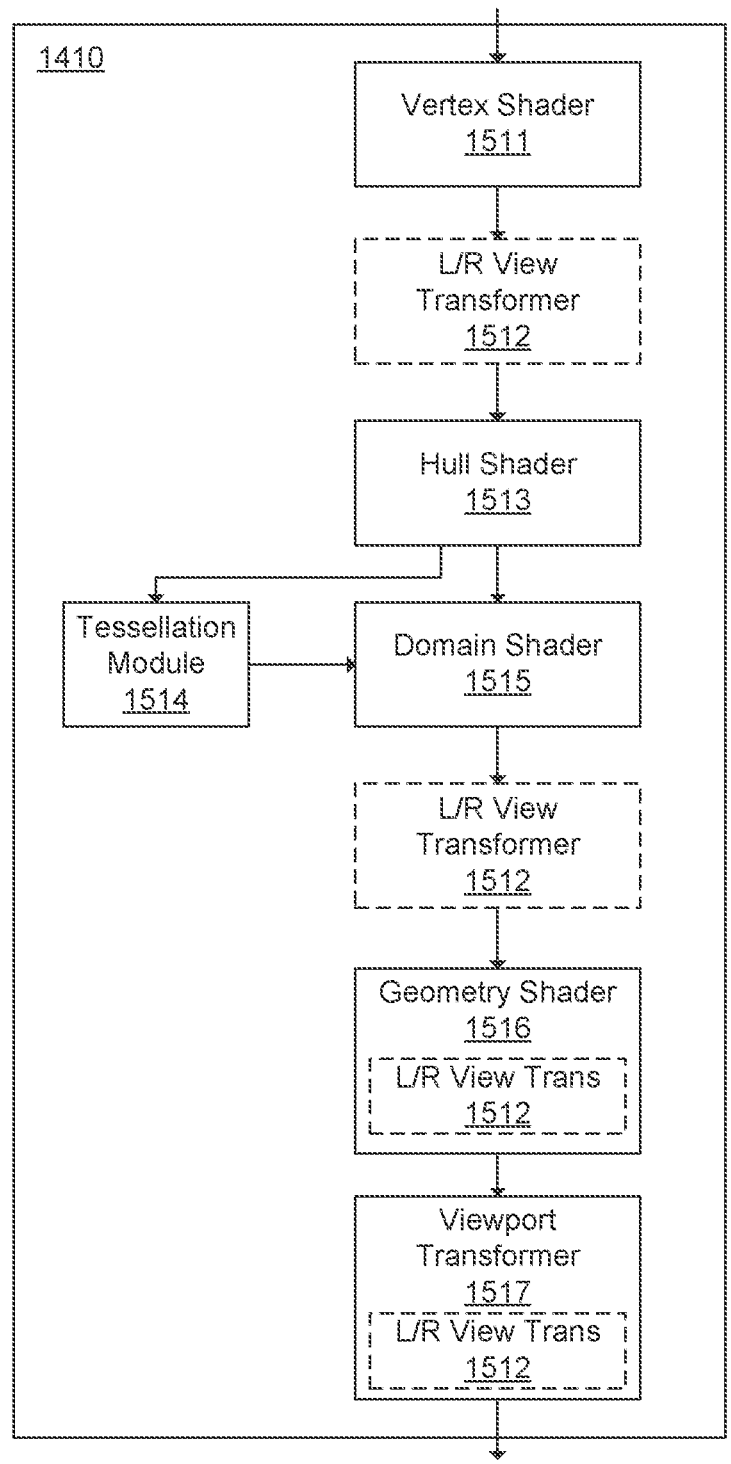
FIG. 15 shows an example geometry processor for implementation.

FIG. 15 illustrates an example geometry processor 1410 that can be implemented in any of the graphics processing modules set forth herein. The geometry processor comprises a vertex shader 1511, a hull shader 1513, a domain shader 1515, a tessellation module 1514, a geometry shader 1516, and a viewport transformer 1517. The geometry processor 1410 further comprises a left/right view transformer 1512 that may be placed at one of a number of different positions within the geometry processor 1410.

The input to the geometry processor is a sequence of geometry in the form of one or more objects which may comprise control points (where tessellation is to be performed) or vertices (where tessellation is not to be performed) that collectively define surfaces of the objects. An example is described below in which the geometry comprises control points describing a surface to be tessellated. The input geometry is passed to a vertex shader 1511 in which a shading operation is performed on the control points as defined by the specific application of the geometry processor. The processed control points are passed to hull shader 1513 that is configured to transform the control points to define one or more patches or domains. The output from the hull shader is passed to both tessellation module 1514 and domain shader 1515.

The tessellation module 1514 is configured to sub-divide a domain into smaller objects such as triangles. The domain shader 1515 is configured to determine vertex coordinates based upon the sub-divided smaller objects generated by the tessellation module 1514. The vertices of the smaller objects are then passed to geometry shader 1516 that is configured to perform further manipulation of the smaller objects. The shaded vertices are then passed to viewport transformer 1517 that is configured to transform the coordinates of each vertex from scene-space, in which the vertices are defined in a three-dimensional space, to a screen-space in which the vertices are defined in a two-dimensional space.

The left/right view transformer 1512 is configured at a general level to generate geometry data for the elements of geometry for both left and right views from the single set of geometry. It will be appreciated that this transformation of a single set of geometry to two streams of geometry can take place at a number of locations in the geometry processor 1410. As illustrated in FIG. 15, the left/right view transformer 1512 can be located between vertex shader 1511 and hull shader 1513, in which case two sets of geometry (left and right) are passed to hull shader for processing 1513. This location for the left/right view transformer 1512 may be considered to be the least optimal of the options illustrated in FIG. 15 since the remaining modules in the geometry processor need to process two sets of geometry. However, spawning two sets of geometry at this stage does still provide improvements over approaches that pass two sets of geometry through the geometry processor since vertex shading at the vertex shader 1511 need only be performed for one set of geometry.

Similarly, the left/right view transformer 1512 may be placed between the domain shader 1515 and the geometry shader 1516 and may therefore spawn two sets of vertices, namely left and right vertices. By placing the left/right view transformer 1512 in this location, more of the processing performed by the geometry processor 1410 can be made more efficient since the domain shader 1515, hull shader 1513, and tessellation module need only operate on a single set of geometry. Similarly, the left/right view transformer 1512 can form part of the geometry shader 1516 or viewport transformer 1517 or can be placed between these two modules. In this way, more elements perform processing before the geometry is split into two sets of geometry.

It will be appreciated that, of the locations for the left/right view transformer 1512 illustrated in FIG. 15, the most efficient location is as part of the viewport transformer 1517. In this way, the separation of the geometry into left and right streams occurs only once the geometry has been defined in terms of screen-space coordinates. This is, in most cases, the latest position in the geometry processor 1410 that the geometry can be separated into left and right streams. This is because the screen-space coordinates for the left and right views will differ due to the different positions of the left and right camera/eye positions. Where the left/right view transformer 1512 is formed as part of the viewport transformer 1517, it is possible to delay the separation of the geometry until after all other processing of the geometry has been completed. In this way, duplication of processing in receiving separate left and right streams of geometry is reduced.

It will be appreciated that a number of the examples provided herein refer to the use of memory for storing data used by the graphics processing modules described herein. For example, one or more of frame buffer pixel data, tile lists, region headers, and geometry data is described as being stored to a memory. In some arrangements, the memory is illustrated twice for ease of understanding. It will be appreciated that this memory may be implemented in one or more physical memories. For example, the data used by the graphics processing module may be stored in one or more memories internal or external to the graphics processing modules. Alternatively, a single memory may be used.

Figure 16:
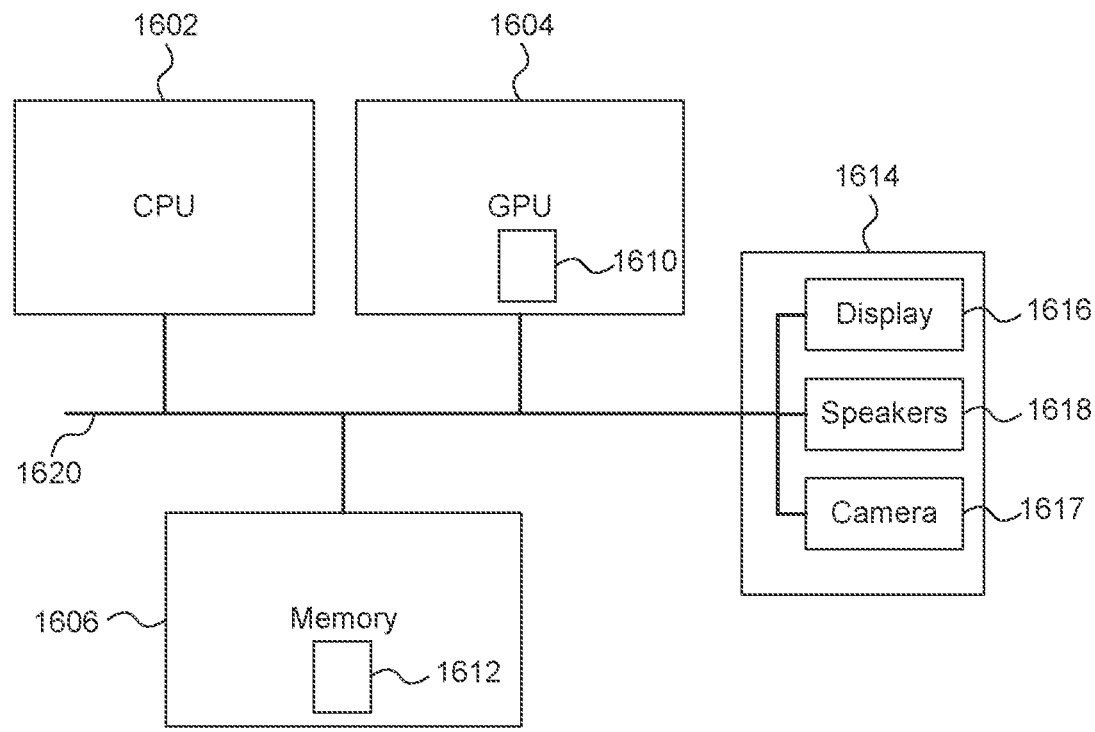
FIG. 16 shows a computer system in which a graphics processing system is implemented.

FIG. 16 shows a computer system in which the graphics processing modules described herein may be implemented. The computer system comprises a CPU 1602, a GPU 1604, a memory 1606 and other devices 1614, such as a display 1616, speakers 1618 and a camera 1617. A processing block 1610 is implemented on the GPU 1604. The processing block 1610 may be implemented on the CPU 1602 and/or the GPU 1604. The memories described herein may be at least in part implemented in memory 1606 and may at least partially be implemented in memory internal to the CPU 1602 and/or the GPU 1604. The components of the computer system can communicate with each other via a communications bus 1620. A store 1612 is implemented as part of the memory 1606.

The graphics processing modules of FIGS. 3 to 15 are shown as comprising a number of functional blocks. This is schematic only and is not intended to define a strict division between different logic elements of such entities. Each functional block may be provided in any suitable manner. It is to be understood that intermediate values described herein as being formed by a graphics processing module need not be physically generated by the graphics processing module at any point and may merely represent logical values which conveniently describe the processing performed by the graphics processing module between its input and output.

The graphics processing modules described herein may be embodied in hardware on an integrated circuit. The graphics processing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing module configured to perform any of the methods described herein, or to manufacture a graphics processing module comprising any apparatus described herein. An integrated circuit definition dataset may be, for example, an integrated circuit description.

Therefore, there may be provided a method of manufacturing, at an integrated circuit manufacturing system, a graphics processing module as described herein. Furthermore, there may be provided an integrated circuit definition dataset that, when processed in an integrated circuit manufacturing system, causes the method of manufacturing a graphics processing module to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing module will now be described with respect to FIG. 17.

Figure 17:
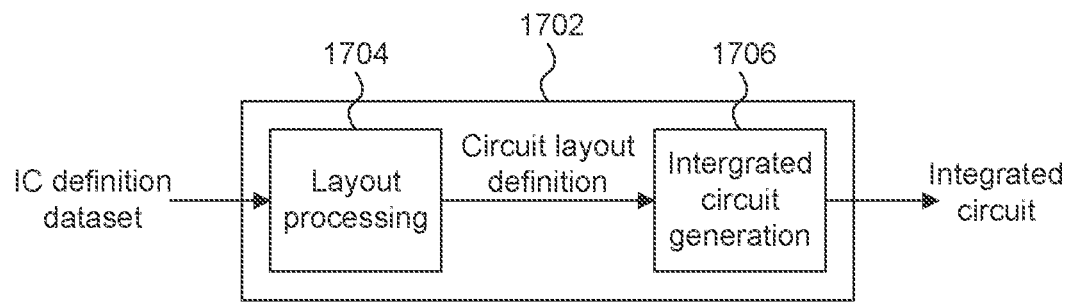
FIG. 17 shows an integrated circuit manufacturing system for generating an integrated circuit embodying a graphics processing system.

FIG. 17 shows an example of an integrated circuit (IC) manufacturing system 1702 which is configured to manufacture a graphics processing module as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a graphics processing module as described in any of the examples herein), process the IC definition dataset, and generate an IC according to the IC definition dataset (e.g. which embodies a graphics processing module as described in any of the examples herein). The processing of the IC definition dataset configures the IC manufacturing system 1702 to manufacture an integrated circuit embodying a graphics processing module as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering a stereoscopic image comprising a left image and a right image of a three-dimensional scene in a graphics processing module, the method comprising:
    processing geometry in the scene to generate left data for use in displaying the left image and right data for use in displaying the right image;
    determining disparity between the left data and the right data based upon a comparison of the generated left data and the generated right data used in displaying the stereoscopic image; and
    while rendering each stereoscopic image:
    commonly processing a portion of the left image and the right image in response to identifying the corresponding portion of the left data and the right data as non-disparate; and
    separately processing another portion of the left image and the right image in response to identifying the corresponding portion of the left data and the right data as disparate.

2. The method according to claim 1, wherein the left data comprises data for elements of geometry for the left image and the right data comprises data for elements of geometry for the right image.

3. The method according to claim 1, wherein the left data comprises pixel values for the left image and the right data comprises pixel values for the right image.

4. The method according to claim 1, wherein the at least a portion of the left data and the at least a portion of the right data relates to a corresponding group of pixels of the left image and the right image.

5. The method according to claim 4, wherein:
    commonly processing a corresponding group of pixels of the left image and the right image comprises rendering pixel values for a single group of pixels for use in displaying the group of pixels in the left image and for use in displaying the corresponding group of pixels in the right image; and separately processing a corresponding group of pixels of the left image and the right image comprises separately rendering pixel values for the group of pixels in the left image and for the corresponding group of pixels in the right image.

6. The method according to claim 5, wherein:

commonly processing a corresponding group of pixels of the left image and right image comprises storing pixel values for a single group of pixels for use in displaying the group of pixels in the left image and for use in displaying the corresponding group of pixels in the right image;

separately processing a corresponding group of pixels in the left image and the right image comprises separately storing pixel values for the group of pixels in the left image and storing pixel values for the corresponding group of pixels in the right image.

7. The method according to claim 6, wherein commonly storing pixel values for a single group of pixels for use in displaying the group of pixels in the left image and for use in displaying the corresponding group of pixels in the right image comprises storing, in memory, the single group of pixels and a flag or reference indicating that the pixel values are for use in displaying the group of pixels in both the left image and the right image.

8. The method according to claim 6, wherein the group of pixels is stored in a frame buffer memory from which the pixel values for the left and right images are to be retrieved for display.

9. The method according to claim 4, wherein the graphics processing module is a tile-based graphics processing module, and wherein the group of pixels forms a tile and optionally wherein the left data comprises data for elements of geometry for the left image and the right data comprises data for elements of geometry for the right image, and wherein the method further comprises maintaining in memory a common tile.

10. The method according to claim 1, further comprising maintaining, for each corresponding pixel position in the left image and the right image, a disparity status that indicates whether there is disparity between the left and right data associated with that pixel position.

11. The method according to claim 10, wherein the disparity status is maintained as elements of geometry are processed and wherein the disparity status is updated based upon the opacity of the received geometry.

12. The method according to claim 10, further comprising, in response to determining that a received element of geometry is visible at a pixel position, updating the disparity status of that pixel position to reflect the disparity between corresponding elements of geometry for the left image and the right image.

13. The method according to claim 1, wherein commonly processing the corresponding portion of the left image and the right image comprises storing a single pixel value for use in a corresponding pixel position in both the left and right images.

14. The method according to claim 1, wherein separately processing the corresponding portion of the left image and the right image comprises storing separate left and right pixel values for a corresponding pixel position in the left and right images.

15. The method according to claim 10, wherein maintaining the disparity status comprises maintaining a left buffer, a right buffer, and optionally a common buffer and wherein commonly processing a corresponding portion of the left image and the right image comprises storing a single pixel value, in the common buffer or one of the left and right buffer, for a corresponding pixel position in both the left and right images; and separately processing the corresponding portion of the left image and the right image comprises storing separate left and right pixel values, in respective left and right buffers or any one of the left and right buffers, for a corresponding pixel position in the left and right images.

16. A graphics processing module configured to render a stereoscopic image comprising a left image and a right image of a three-dimensional scene, the graphics processing module being implemented in hardware and being configured to:

process geometry in the scene to generate left data for use in displaying the left image and right data for use in displaying the right image;

determine disparity between the left data and the right data based upon a comparison of the generated left data and the generated right data used in displaying the stereoscopic image;

while rendering each stereoscopic image:

commonly process a portion of the left image and the right image in response to identifying the corresponding portion of the left data and the right data as non-disparate; and separately process another portion of the left image and the right image in response to identifying the corresponding portion of the left data and the right data as disparate.

17. A non-transitory computer readable storage medium having stored thereon computer readable code that when run on at least one processor causes the method of claim 1 to be performed.

18. A non-transitory computer readable storage medium having stored thereon a computer readable dataset description of an integrated circuit that, when processed in an integrated circuit manufacturing system, causes the integrated circuit manufacturing system to manufacture a graphics processing module as claimed in claim 16.

19. An integrated circuit manufacturing system comprising:

a non-transitory computer readable storage medium having stored thereon a computer readable dataset description of an integrated circuit that describes the graphics processing module as set forth in claim 16;

a layout processing system configured to process the integrated circuit dataset description so as to generate a circuit layout description of the graphics processing module as set forth claim 16; and an integrated circuit generation system configured to manufacture the graphics processing module according to the circuit layout description.

20. A graphics processing module configured to render a stereoscopic image comprising a left image and a right image of a three-dimensional scene, the graphics processing module comprising a combination of firmware and processor-executable instructions stored on a non-transitory processor readable storage medium, the combination being configured to:

process geometry in the scene to generate left data for use in displaying the left image and right data for use in displaying the right image;

determine disparity between the left data and the right data based upon a comparison of the generated left data and the generated right data used in displaying the stereoscopic image;

while rendering each stereoscopic image:

commonly process a portion of the left image and the right image in response to identifying the corresponding portion of the left data and the right data as non-disparate; and separately process another corresponding portion of the left image and the right image in response to identifying the corresponding portion of the left data and the right data as disparate.

* * * * *